United States Patent
Cohen

(10) Patent No.: US 9,103,991 B2
(45) Date of Patent: Aug. 11, 2015

(54) MULTI-POLE OPTICAL SIGNAL SWITCH

(75) Inventor: Gil Cohen, Livingston, NJ (US)

(73) Assignee: Finisar Corporation, Sunnyvale, CA (US)

( * ) Notice: Subject to any disclaimer, the term of this patent is extended or adjusted under 35 U.S.C. 154(b) by 758 days.

(21) Appl. No.: 13/153,920

(22) Filed: Jun. 6, 2011

(65) Prior Publication Data

US 2011/0234951 A1    Sep. 29, 2011

Related U.S. Application Data

(63) Continuation-in-part of application No. 12/911,661, filed on Oct. 25, 2010, now Pat. No. 8,078,019, which is a continuation of application No. 12/066,249, filed as application No. PCT/IL2006/001052 on Sep. 10, 2006, now Pat. No. 7,822,303.

(60) Provisional application No. 60/715,695, filed on Sep. 8, 2005.

(51) Int. Cl.
*G02B 6/35* (2006.01)
*G02B 6/293* (2006.01)
*G02B 6/27* (2006.01)
(Continued)

(52) U.S. Cl.
CPC ............ *G02B 6/3512* (2013.01); *G02B 6/2713* (2013.01); *G02B 6/29311* (2013.01); *G02B 6/356* (2013.01); *G02B 6/3518* (2013.01); *H04Q 11/0005* (2013.01); *G02B 6/29313* (2013.01); *G02B 6/29383* (2013.01); *G02B 6/3548* (2013.01); *G02B 6/3594* (2013.01); *H04J 14/0204* (2013.01); *H04J 14/0205* (2013.01); *H04J 14/0212* (2013.01); *H04J 14/0219* (2013.01); *H04Q 2011/003* (2013.01); *H04Q 2011/0035* (2013.01)

(58) Field of Classification Search
None
See application file for complete search history.

(56) References Cited

U.S. PATENT DOCUMENTS

| | | |
|---|---|---|
| 6,947,628 B1 | 9/2005 | Peng et al. |
| 6,978,076 B2 * | 12/2005 | Kishida et al. ................ 385/140 |

(Continued)

FOREIGN PATENT DOCUMENTS

| | | |
|---|---|---|
| EP | 1932033 B1 | 8/2014 |
| JP | 7-261203 | 10/1995 |

(Continued)

OTHER PUBLICATIONS

European Patent Application No. 06 796 076.5-2217 Office Action (Mar. 9, 2012).

(Continued)

*Primary Examiner* — Michelle R Connelly
(74) *Attorney, Agent, or Firm* — Kurt Rauschenbach; Rauschenbach Patent Law Group, LLC

(57) ABSTRACT

An optical switch having multiple input and output ports directs any number of WDM signals, each arriving at a respective input port, to any one of the output ports. The optical switch includes an array of LC pixels, each positioned to receive a WDM signal transmitted through one of the ports, and an array of reflective elements, each associated with one of the LC pixels. The LC pixels are controlled to cause a WDM signal incident thereon to attain an attenuation state while an output of the WDM signal is being switched by an associated reflective element, such that when an output for a WDM signal is switched from a first port to a second port, the switching can be performed in a hitless manner.

26 Claims, 20 Drawing Sheets

(51) Int. Cl.
  *H04Q 11/00* (2006.01)
  *H04J 14/02* (2006.01)

(56) References Cited

U.S. PATENT DOCUMENTS

| | | | |
|---|---|---|---|
| 7,092,599 B2 | 8/2006 | Frisken | |
| 7,397,980 B2 * | 7/2008 | Frisken | 385/24 |
| 7,822,303 B2 * | 10/2010 | Cohen et al. | 385/18 |
| 7,861,736 B2 * | 1/2011 | Choi | 359/256 |
| 8,078,019 B2 * | 12/2011 | Cohen et al. | 385/18 |
| 2001/0050787 A1 | 12/2001 | Crossland et al. | |
| 2003/0043471 A1 * | 3/2003 | Belser et al. | 359/634 |
| 2006/0067611 A1 | 3/2006 | Frisken et al. | |
| 2007/0279738 A1 * | 12/2007 | Suh et al. | 359/484 |

FOREIGN PATENT DOCUMENTS

| | | |
|---|---|---|
| JP | 8-510564 | 11/1996 |
| JP | 2002-262318 | 9/2002 |
| JP | 2003-515187 | 4/2003 |
| JP | 2003-262822 | 9/2003 |
| JP | 2005-502080 | 1/2005 |
| JP | 2008-536168 | 9/2008 |
| JP | 4875087 | 12/2011 |
| WO | WO 94/28456 A1 | 12/1994 |
| WO | WO 01/37021 A1 | 5/2001 |
| WO | WO 02/075410 A1 | 9/2002 |
| WO | WO 03/021316 A1 | 3/2003 |
| WO | WO 03/032071 A1 | 4/2003 |
| WO | WO 2005/052507 A1 | 6/2005 |
| WO | WO 2006/110297 A2 | 10/2006 |
| WO | WO 2006/123344 A2 | 11/2006 |
| WO | 2007/029260 A2 | 3/2007 |

OTHER PUBLICATIONS

"Search Report" for PCT/IL06/01052, Apr. 18, 2007, 3 pages, International Searching Authority/US, Alexandria, VA, US.

"Written Opinion" for PCT/IL06/01052, Apr. 18, 2007, 4 pages, International Searching Authority/US, Alexandria, VA, US.

* cited by examiner

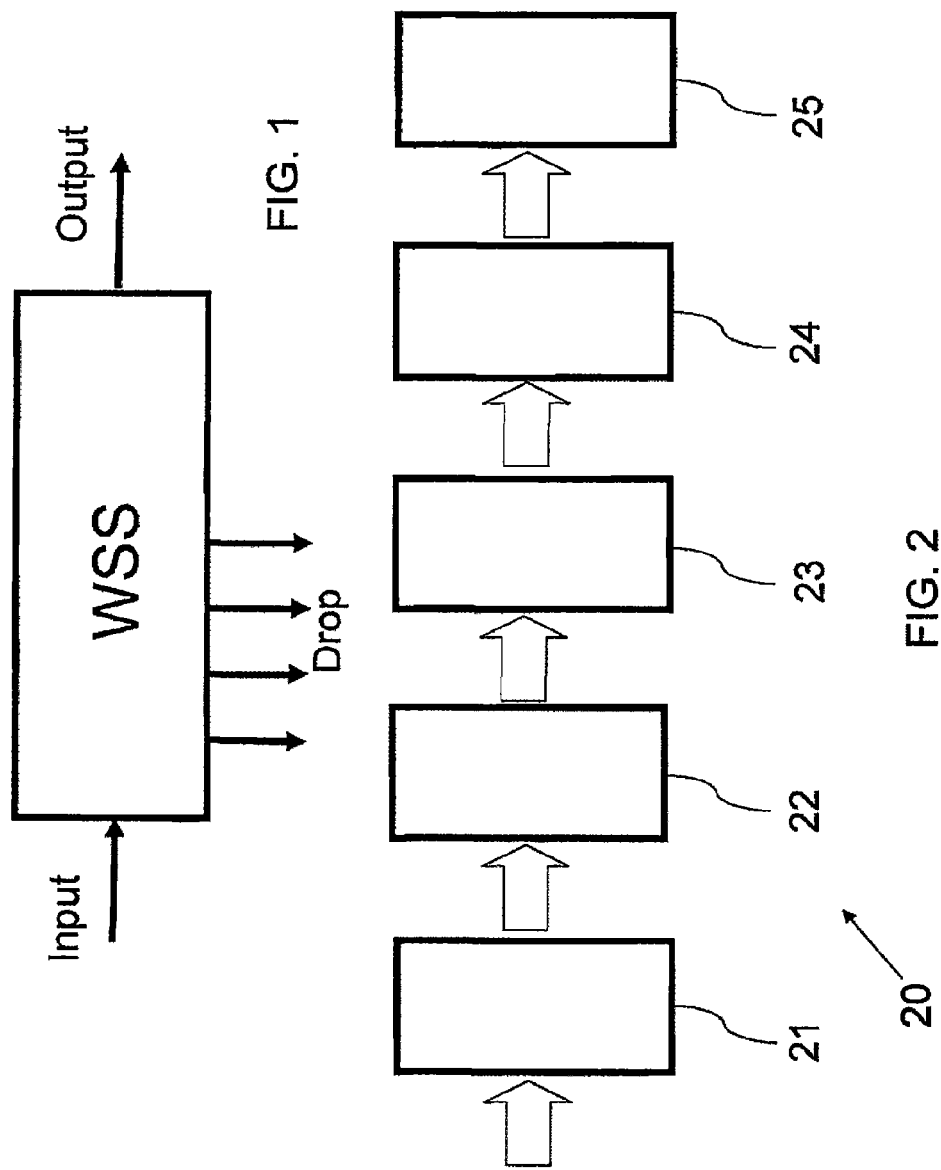

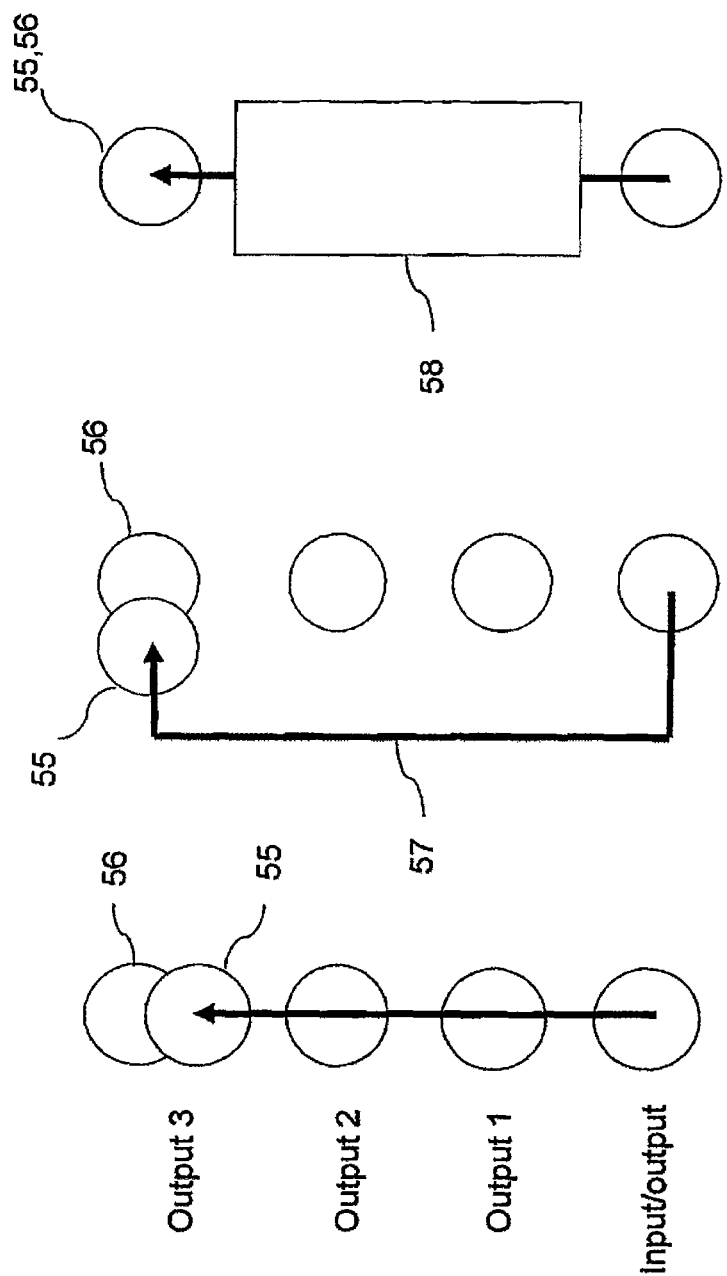

| P polarization
° S polarization

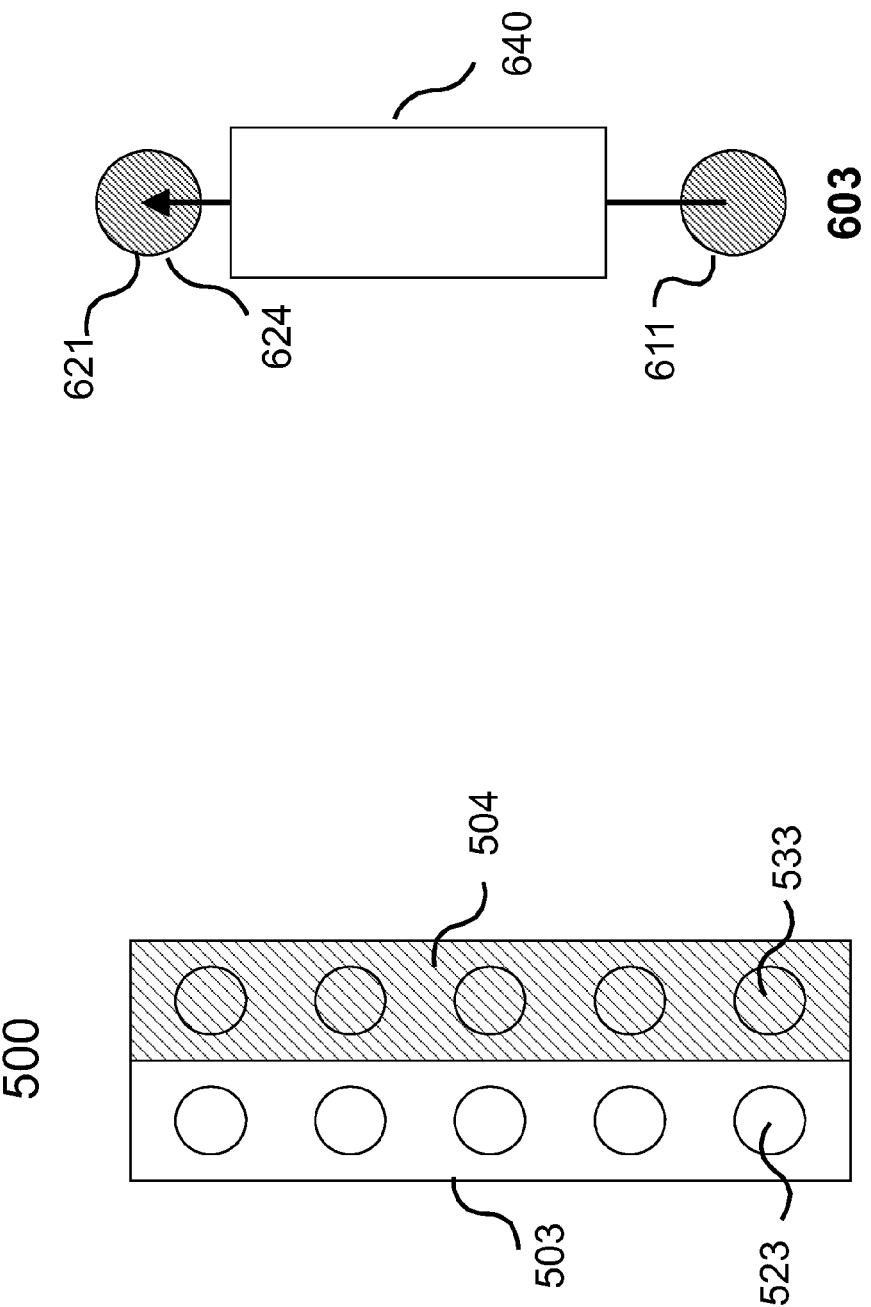

MULTI-POLE OPTICAL SIGNAL SWITCH

CROSS-REFERENCE TO RELATED APPLICATION(S)

This application is a continuation-in-part of U.S. patent application Ser. No. 12/911,661, filed Oct. 25, 2010, now U.S. Pat. No. 9,078,019 which is a continuation of U.S. patent application Ser. No. 12/066,249, filed Sep. 3, 2008, now U.S. Pat. No. 7,822,303, which is a national stage application of PCT Application No. PCT/IL2006/001052, filed Sep. 10, 2006, which claims the benefit of U.S. Provisional Patent Application Ser. No. 60/715,695, filed Sep. 8, 2005.

BACKGROUND OF THE INVENTION

1. Field of the Invention

One or more embodiments of the present invention relate to the field of optical communication networks and in particular to an optical router for directing any input optical signal arriving at any one or more input ports in a network node to one or more output ports.

2. Description of the Related Art

It is known in the field of optical communications to use optical wavelengths as optical carriers for carrying digital or analog information. Also, the different wavelengths may be used to discriminate one set or channel of information from another. When a plurality of wavelengths are coupled or multiplexed onto a single fiber, this is called wavelength division multiplexing (WDM). Use of such WDM increases the overall bandwidth of the system.

There is a need in such systems to switch packets of optical information passing along one fiber to any of a number of other fibers, according to the wavelength of the optical signal. Such a switch is known as an optical router or a wavelength selective switch. A number of wavelength dependent switches and routers exist in the prior art. In co-pending PCT Applications. PCT/IL2002/00511, PCT/IL2003/01002 and PCT/IL2006/00590, all hereby incorporated by reference, each in its entirety, there are disclosed wavelength selective switches wherein an input optical signal is spatially wavelength-dispersed and polarization-split in two preferably perpendicular planes. The wavelength dispersion is preferably performed by a diffraction grating, and the polarization-splitting by a polarized beam splitter. A polarization rotation device, such as a liquid crystal polarization modulator, pixilated along the wavelength dispersive direction such that each pixel operates on a separate wavelength channel, is operative to rotate the polarization of the light signal passing through each pixel, according to the control voltage applied to the pixel. The polarization modulated signals are then wavelength-recombined and polarization-recombined by means of similar dispersion and polarization combining components as were used to respectively disperse and split the input signals. At the output polarization recombiner, the direction in which the resulting output signal is directed is determined by whether the polarization of the particular wavelength channel was rotated by the polarization modulator pixel, or not. PCT Application Nos. PCT/IL2003/01002 and PCT/IL2006/00590 also incorporate lateral expansion of the polarized beams in the plane of the dispersion.

Such fast, wavelength selective, optical switch structures are capable of use in WDM switching applications, but are generally limited to 2×2 configurations, for use as channel blockers or attenuators. In U.S. Pat. No. 7,092,599 to S. J. Frisken for "Wavelength Manipulation System and Method," there is described a wavelength manipulation system using an LCOS phased array, with an optical arrangement including a spherical mirror and a cylindrical lens for maintaining collimation of the input beams in the direction of dispersion, and for focusing of the input beams in the direction perpendicular to the direction of dispersion. In published U.S. Patent Application No. 2006/0067611 for "Wavelength Selective Reconfigurable Optical Cross Connect," there is described an optical coupling device using art LCOS phased array, with an optical arrangement including at least a cylindrical mirror and a cylindrical lens.

There therefore exists a need for a new optical, multi-pole, multi-way wavelength selective switch structure having a simple optical structure, for use in channel routing applications, with the addition of add and drop functionalities. In addition, there exists a need for a new optical, multi-pole, multi-way switch structure that can route WDM signals from any input port to any output port in a hitless manner.

The disclosures of each of the publications mentioned in this section and in other sections of the specification are hereby incorporated by reference, each in its entirety.

SUMMARY OF THE INVENTION

An embodiment of the present invention seeks to provide a new fiber-optical, multi-way, wavelength selective switch (WSS) structure, such as is used for channel routing and/or blocking applications in optical communication and information transmission systems. Add and drop functionality, from and to a number of ports, can also be implemented in this switch structure. The switch uses a minimum of components, and can thus be economically constructed for large scale use in such systems. The switch structure can also be used as a wavelength selective variable optical attenuator for any of the transfer routes therethrough.

The switch structure utilizes conversion, preferably by the use of birefringent crystals, of optical signals input to any port of the switch, to light beams having a defined polarization, preferably linear, and which are mutually disposed in a predetermined plane with respect to the system plane in which optical manipulation of the beam traversing the WSS is to be performed. This is followed by lateral expansion of the polarized beams in this predefined plane. This lateral expansion is preferably performed by means of a pair of anomorphic prisms, though any alternative method can be utilized, such as a cylindrical lens telescope system, or even a single prism, as is known in the art. The beam is then spatially wavelength-dispersed in the same predetermined plane as that of the beam expansion, preferably by means of a diffraction grating. Lateral expansion of the beam, combined with dispersion in the same plane as that of the lateral expansion provides the WSS with advantages compared to prior art switches, especially with respect to the reduction in switch height thus enabled, and with respect to the increased wavelength resolution thus enabled. The light is then directed through a polarization rotation device, preferably a liquid crystal (LC) cell pixilated along the wavelength dispersive direction, such that each pixel operates on a separate wavelength. When the appropriate control voltage is applied to a pixel, the polarization of the light signal passing through that pixel is rotated, thereby blocking, transmitting or attenuating the particular wavelength channel passing through that pixel.

After beam polarization rotation, the light passing through each pixel is angularly deflected using a beam steering element. The beam steering element is pixilated along the wavelength dispersive direction, such that each beam steering pixel also operates on a separate wavelength. When the appropriate control voltage is applied to a beam steering pixel, the wavelength component associated with that liquid crystal pixel is steered by the beam steering pixel towards its desired direction. The beam can be steered either in the plane of the wavelength dispersion, conventionally called the horizontal direction of the switch structure, or perpendicular thereto, known as the vertical direction of the switch structure. Perpendicular steering has an advantage in that the angular deviation generated by the beam steering does not interfere with the angular deviation generated by the wavelength dispersion, thus simplifying construction.

The steering of the beam through each individual pixel enables light of different wavelengths, after being transmitted or attenuated, to be directed to different output ports, according to the various paths defined by the beam steering angles. Additionally, the light of a specific wavelength can be blocked, in which case the beam steering is unused.

The wavelength dispersed, steered beams from the polarization rotation pixels are then recombined, followed by beam contraction and passage back through an output birefringent crystal towards the switch outputs. The wavelength selective switch can be reflective, in which case the steered beams are returned through the same device as was used to disperse the multiwavelength input beams, through the same lateral beam expander that was used to laterally expand the input beams, and through the same polarization manipulator that was used on the input beams. Because of the beam steering of the present invention, each angularly displaced, steered beam passes through these components at a slightly displaced location, depending on the beam steering angle, and an array of output collimators is disposed at the end of the output birefringent crystal to collect each steered beam at a separate output port according to the steered beam angle. Alternatively and preferably, the WSS can be transmissive, in which case the steered beams are output from the device through separate dispersive elements, beam contracting elements and polarization manipulation elements.

The WSS of the present invention has a significant advantage over prior art switches, in that the polarization rotation element can be operated in co-operation with the beam steering device in such a manner that the steered beam is prevented from coupling into any output ports other than its destined output port. This is achieved by adjusting the transmissivity of the polarization rotation device in the pathways to undesired output ports, such that output to them is blocked as the steered beam passes over them. In this way, a hitless switching configuration can be achieved using only a one-dimensional steering array.

The beam steering elements can be any miniature element which is capable of deviating the path of the beam impinging thereon. According to one preferred embodiment, an array of Micro-Electro-Mechanical System (MEMS) components, such as micro-mirrors, are used to generate the steering. The angle of deviation of such MEMS elements can be controlled electronically to provide the desired beam steered angle.

Alternatively and preferably, the beam steering can be performed by utilizing a set of serially disposed liquid crystal arrays and prismatic polarization separators, such as wedge shaped birefringent walk-off crystals, which generate different angles of propagation to the beam passing therethrough, according to the different polarizations of the beams produced by the setting of the liquid crystal array pixels. The steered angle of a beam passing through a particular liquid crystal pixel is determined by the polarization rotation setting of each of the serial LC pixels through which the beam passes. This embodiment has the advantage of generating the beam steering without any moving parts, but the disadvantage of a more complex control system and possibly higher cross-talk between channels.

According to a further preferred embodiment, the beam steering can be generated by use of a liquid crystal-on-silicon (LCOS) spatial light modulator acting as a phased array. In an LCOS device, the light is passed through a pixilated layer of liquid crystal material layer disposed over a reflective substrate formed on the front of a CMOS substrate, on which is implemented a circuit array for driving the various pixels of the LC layer between their states. According to these states, the light traverses each pixel either undeflected, and is reflected back along its incident path, or is deflected and thus reflected back along a different path to a different optical port from that by which it reached the LCOS pixel. The pixels on such a device are generally so small that each wavelength component covers a number of pixels, even with the smallest optical dimensioning practical. The complete 2-dimensional LCOS array is then programmed to direct the various wavelength components of the input channels to the directions desired for each wavelength according to the phase shifts applied to the various pixels in the LC pixels for each wavelength.

In all of the preferred WSS embodiments of the present invention, the operation of the device is essentially reciprocal, such that signals for switching can be input at what has been described in this application as "output" ports, and conversely, can be output at what has been called "input" ports. It is therefore to be understood that the terms input and output in this application can be used interchangeably, and are also claimed in such manner, and that the invention is not intended to be limited by the directional nomenclature of a particular port. Wherever a particular port is to be used for input or output, it is to be understood that a signal separation device such as a circulator has to be used to separate the input from the output directional signals.

The channel switching rate is determined by the slower of the switching rates of both the LC blocking/transmitting/attenuating element, and of the beam steering device, since the beam must be processed by both. In either the case of MEMS or of LC beam steering, the rate achievable is suitable for use in WDM or DWDM switching applications.

There is therefore provided, according to a first preferred embodiment of the present invention, a wavelength selective switch (WSS) comprising: (i) at least a first port for inputting at least a first multi-wavelength optical signal, (ii) a plurality of output ports for outputting different wavelength components of the at least first multi-wavelength optical signal, (iii) a polarization transformation device for converting each of the at least first multi-wavelength optical signals into a pair of multi-wavelength optical beams disposed in a predetermined plane and having the same predefined polarization, (iv) a beam expanding device for laterally expanding the multi-wavelength optical beams of predefined polarizations in the predetermined plane, (v) a wavelength dispersive element receiving the laterally expanded optical beams of predefined polarizations and dispersing wavelength components thereof in the predetermined plane, (vi) a polarization rotation element, pixilated generally along the direction of the dispersion, adapted to rotate the polarization of light passing through pixels thereof according to control signals applied to the pixels, such that the polarization of at least one wavelength component of the dispersed optical beams is rotated according to the control signal applied to the pixel through which the at least one wavelength component passes, and (vii) a pixilated beam steering element disposed such that the at least one wavelength component passing through a pixel of the polarization element is steered towards its desired output port according to the settings of the pixel of the beam steering device associated with the at least one wavelength component.

In the above described WSS, the at least one wavelength component is preferably attenuated in accordance with the control signal applied to the pixel of the polarization rotation element associated with the at least one wavelength component. The beam steering element may be any of an array of Micro Electro-Mechanical System (MEMS) mirrors, each mirror of the array having a single axis of rotation, or a Liquid Crystal on Silicon (LCOS) array, or a sequence of pairs of adjustable polarization rotation elements and birefringent prisms, wherein the at least one wavelength component is steered in accordance with the settings of the adjustable polarization rotation elements through which the at least one wavelength component passes.

In accordance with still another preferred embodiment of the present invention, any of the above described switches may preferably further comprise at least one optical element for focusing the dispersed wavelength components of the expanded light beams onto the beam steering element. This focusing may be performed by a lens, or by use of a wavelength dispersive element also having optical focusing power.

Additionally, in the above described WSS's, the polarization rotation element may be a liquid crystal element; the polarization transformation device may be a birefringent walk-off crystal with a half-waveplate disposed on part of its output face; the beam expanding device may be any one of a pair of anomorphic prisms, a cylindrical lens telescope system, and a single prism; and the wavelength dispersive element may be a diffraction grating.

In the above-described embodiments using a MEMS array, the pixel of the polarization rotation element associated with the at least one wavelength component may be preferably controlled to block the passage of the at least one wavelength component during switching, at least when the at least one wavelength component crosses a path to an undesired output port.

According to a further preferred embodiment, the pixilated beam steering element, of whatever type, is adapted to steer the at least one wavelength component in a direction such that the steered wavelength component does not cross the path of any other undesired wavelength component.

There is further provided in accordance with still another preferred embodiment of the present invention, a WSS as described above, and also comprising a beam demagnifier disposed such that the dimensions of the multi-wavelength optical beams are reduced in the direction perpendicular to the plane of dispersion.

Furthermore, in any of the above-described embodiments, the pixilated beam steering element may either be a reflective element, such that the steered beam accesses its destined output port through those optical components used to direct the optical signal from the input port to the beam steering element, or it may be a transmissive element, such that the steered beam accesses its destined output port through additional optical components which direct the optical signal from the beam steering element to the output port.

Additionally, any of the above-described embodiments may further comprise a beam monitoring array for determining the signal level in any port.

In accordance with still another preferred embodiment of the present invention, there is further provided a wavelength selective switch comprising: (i) at least a first port for inputting at least a first multi-wavelength optical signal, (ii) a plurality of output ports for outputting different wavelength components of the at least first multi-wavelength optical signal, (iii) a polarization transformation device for converting each of the at least first multi-wavelength optical signals into a pair of multi-wavelength optical beams disposed in a predetermined plane and having the same predefined polarization, (iv) a beam expanding device for laterally expanding the multi-wavelength optical beams of predefined polarizations in the predetermined plane, (v) a wavelength dispersive element receiving the laterally expanded optical beams of predefined polarizations and dispersing wavelength components thereof in the predetermined plane, and (vi) a beam steering element comprising a pixilated Liquid Crystal on Silicon (LCOS) array, the LCOS array being configured to direct different ones of the wavelength components to output ports in accordance with control signals applied thereto. The pixilated LCOS array may preferably be configured to attenuate different ones of the wavelength components in accordance with the control signals applied thereto.

Any of the above described WSS's incorporating an LCOS array, preferably further comprises a beam deflecting element adapted to increase the steered beam deflection angle. This beam deflecting element may be any one of a diffractive optical element, a holographic element, a sequential series of reflecting surfaces, and a divergent prism assembly.

There is further provided in accordance with still another preferred embodiment of the present invention, a wavelength selective switch comprising: (i) at least a first port for inputting a multi-wavelength optical signal, (ii) a plurality of output ports for outputting different wavelength components of the multi-wavelength optical signal, (iii) a beam expanding device for laterally expanding at least one beam generated from the multi-wavelength optical beams in a predetermined plane, (iv) a wavelength dispersive element receiving the at least one laterally expanded optical beam and dispersing wavelength components thereof in the predetermined plane, (v) a pixilated beam attenuating array operating on the dispersed wavelength components, and (vi) a pixilated beam steering element adapted to steer at least one of the dispersed wavelength components towards a desired output port, wherein the pixilated beam attenuating array is operated in co-operation with the beam steering device in such a manner that the steered beam is prevented from coupling into any output ports other than its desired output port.

In such a WSS, the pixilated beam attenuating array may preferably be controlled to block transmission of the steered beam during switching, at least while it traverses the paths to output ports other than the desired output port.

In accordance with still another preferred embodiment of the present invention, there is further provided a method of switching selected wavelength components of a multi-wavelength input optical signal to a desired output port, the method comprising the steps of: (i) generating at least one beam from the multi-wavelength input optical signal, (ii) laterally expanding the at least one multi-wavelength optical beam in a predetermined plane, (iii) spatially dispersing in the predetermined plane the at least one multi-wavelength optical beam to generate wavelength components thereof, (iv) providing a pixilated beam attenuating array to attenuate the dispersed wavelength components, and (v) steering at least one of the dispersed wavelength components towards a desired output port, wherein the steering is performed in co-operation with the attenuation in such a manner that the steered beam is prevented from coupling into any output ports other than its desired output port.

According to this method, the pixilated beam attenuating array may preferably be controlled to block transmission of the at least one steered wavelength component during switching, at least while it traverses the paths to output ports other than the desired output port.

In accordance with a still further preferred embodiment of the present invention, there is also provided a method of switching selected wavelength components of at least one multi-wavelength input optical signal to a desired output port, the method comprising the steps of: (i) transforming the polarization of each of the at least one multi-wavelength optical signals into a pair of multi-wavelength optical beams having predefined polarizations, (ii) laterally expanding the multi-wavelength optical beams of predefined polarizations in a predetermined plane, (iii) spatially dispersing in the predetermined plane, the laterally expanded, multi-wavelength optical beams into a series of spatially separated wavelength beams, (iv) utilizing a polarization rotation element, pixilated generally along the direction of the dispersion, for rotating the polarization of light passing through pixels thereof according to control signals applied to the pixels, such that the polarization of at least one wavelength component of the dispersed optical beams is rotated according to the control signal applied to the pixel through which the at least one wavelength component passes, and (v) steering the at least one wavelength component passing through a pixel of the polarization element, by use of a pixilated beam steering device, towards its desired output port according to the settings of the pixel associated with the at least one wavelength component, of the beam steering device.

There is further provided in accordance with yet more preferred embodiments of the present invention, the above described method, modified by the incorporation of any of the adaptations, additions or limitations described in relation to the WSS embodiments described immediately hereinabove.

Further embodiments of the present invention provide an optical switch having multiple input and output ports, that can direct any number of WDM signals, each arriving at a respective input port, to any one of the output ports. According to such embodiments of the present invention, when an output for a WDM signal is switched from a first port to a second port, the switching can be performed in a hitless manner.

An optical device, according to an embodiment of the present invention, includes multiple ports for transmitting WDM signals therethrough, an array of LC pixels, each positioned to receive a WDM signal transmitted through one of the ports, and an array of reflective elements, each associated with one of the LC pixels. The LC pixels are controlled to cause a WDM signal incident thereon to attain an attenuation state while an output of the WDM signal is being switched by an associated reflective element. A control unit may be provided for controlling the LC pixels and the reflective elements and to synchronize the timing of the control of the LC pixels relative to the switching of the associated reflective elements.

An optical device, according to another embodiment of the present invention, includes multiple ports, an array of LC pixels, each LC pixel positioned in an optical path of a WDM signal transmitted through one of ports, and an array of reflective elements, each associated with one of the LC pixels and being movable to multiple positions to direct a WDM signal transmitted through the associated LC pixel to any one of the ports. The LC pixels and the reflective elements are controlled to switch an output of a WDM signal from a first port to a second port while attenuating substantially all of the WDM signal as one of the reflective elements is being moved to switch the output of the WDM signal from the first port and the second port. A control unit may be provided for controlling the LC pixels and the reflective elements and to synchronize the timing of the control of the LC pixels relative to the switching of the associated reflective elements.

A method of switching outputs of multi-pole optical beams in an optical device having multiple ports, LC pixels and reflective elements, according to an embodiment of the present invention, includes the steps of: (i) controlling a first LC pixel to change a polarization state of a multi-pole optical beam incident thereon from a first state to a second state, (ii) after the polarization state of the multi-pole optical beam has been changed from the first state to the second state, moving a reflective element associated with the first LC pixel from a first position, at which position the multi-pole optical beam is directed to the first port, to a second position, at which position the multi-pole optical beam is directed to the second port, and (iii) after the reflective element associated with the first LC pixel has been moved from the first position to the second position, controlling the first LC pixel to change the polarization state of the multi-pole optical beam from the second state to the first state.

BRIEF DESCRIPTION OF THE DRAWINGS

The present invention will be understood and appreciated more fully from the following detailed description, taken in conjunction with the drawings.

FIG. 1 illustrates schematically a block diagram of the functionality of an optical wavelength router according to a first preferred embodiment of the present invention.

FIG. 2 illustrates schematically the structure of a reflective embodiment of FIG. 1, using beam steering.

FIGS. 5C to 5E illustrate schematically another preferred embodiment of the present invention, providing a hitless beam steering configuration.

FIG. 19 shows an end view of a polarization selection module of FIGS. 15 and 16, with its half-wave plate covering one part of the output port.

FIG. 20 illustrates schematically a hitless beam steering configuration according to one or more embodiments of the present invention.

DETAILED DESCRIPTION

Figure 3:
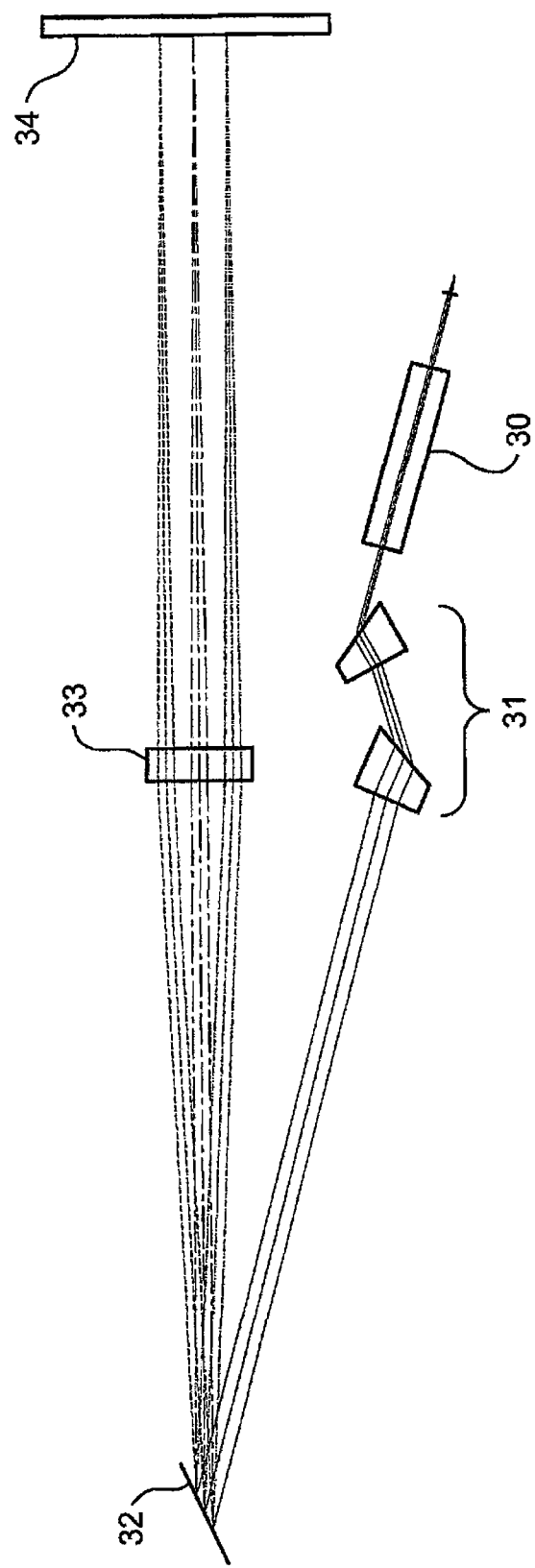
FIG. 3 is a schematic plan view, showing approximate component location and layout, of a reflective wavelength selective router, constructed and operative according to another preferred embodiment of the present invention.

Reference is now made to FIG. 1, which illustrates schematically a block diagram of the functionality of an optical wavelength router, including a single input port, a single main output port and a number of Drop ports. The function of the router is to either transmit, to block or to attenuate any wavelength channel in the input signal, and to direct that signal, if transmitted or attenuated, to any of the output or Drop ports.

Reference is now made to FIG. 2, which illustrates schematically the router 20 of FIG. 1, as implemented according to a preferred embodiment of the present invention, in the form of a block diagram of the functionality of the separate operative parts of the router. The signals are input to the router through a Fiber Interface Block 21, which accepts the input signals and converts them into free-space beams for polarization processing, lateral expansion and spatial manipulation. According to a preferred embodiment of the present invention, the free-space beams are first polarization processed in the polarization selection module 22, to generate pairs of beams mutually disposed in a predetermined plane, with like polarization, and then spatially expanded in that plane by means of a beam expander block, 23, by one of the methods known in the art. The spatially expanded beams are then dispersed in that plane in a Dispersion Optics Module, 24. Finally, the dispersed beam wavelength components are directed onto a Focal Plane Beam Steering Module 25, which incorporates a pixilated LC array for selecting the optical transmissibility applied to each wavelength channel, and a pixilated beam steering array which directs each wavelength channel in the selected direction according to which output or Drop port is to be selected for each wavelength channel. The dispersed beam wavelength components are preferably directed onto the Focal Plane Beam Steering Module 25, by an element with positive optical power, which can either be a separate focusing element such as a lens, or can be implemented by use of a dispersion element also having optical focusing power.

FIG. 2 illustrates schematically the structure of a reflective embodiment of FIG. 1, in that after transmission processing and beam steering, each wavelength channel beam is returned by reflection in a reflective surface incorporated into the beam steering module 24, back through the Dispersion Optics Module 22 to the beam expander block 22, and to the Fiber Interface Block 21, which is operative, in addition to its input role, also to output the switched beams to their selected output fibers. Such a reflective arrangement provides the most cost-effective and compact embodiment of this invention. It is to be understood, however, that a transmissive embodiment based on the component parts of FIG. 2 is equally feasible, with the Dispersion Optics Module 23, the beam expander block 22, and the Fiber Interface Block 21 repeated in that order after the Beam Steering Module 24, i.e., to the right of it in FIG. 2. Such a transmissive embodiment is understood to be included in all of the generalized embodiments of the present invention, where the exact optical arrangement, i.e., transmissive or reflective, is not specified. Detailed descriptions of some reflective and transmissive embodiments are given hereinbelow.

Reference is now made to FIG. 3, which is a schematic plan view, showing preferred component location and layout of a reflective wavelength selective routing switch, constructed and operative according to another preferred embodiment of the present invention. The embodiment of FIG. 3 shows a fiber interface input/output block, which includes a polarization conversion device 30, such as a birefringent walk-off crystal with a half wave plate over part of its output. The like-polarization free-space beams thus generated are passed to a one dimensional beam expander 31, shown in this embodiment as a pair of anomorphic prisms, which are operative to expand the beams in the plane of the drawing. The expanded beams are then directed to a dispersive grating element 32, shown in this embodiment as a reflective grating, which disperses the wavelength components of each input beam in the same plane as that in which the beams were generated and expanded, namely, in the plane of the drawing paper, and a focusing lens 33 focuses the separated wavelength components onto the focal plane beam steering module 34, which is shown in more detail in the following drawings. It is to be understood that the wavelength selective router can equally be implemented in a transmissive embodiment, as explained hereinabove.

Figures 4A, 4B:
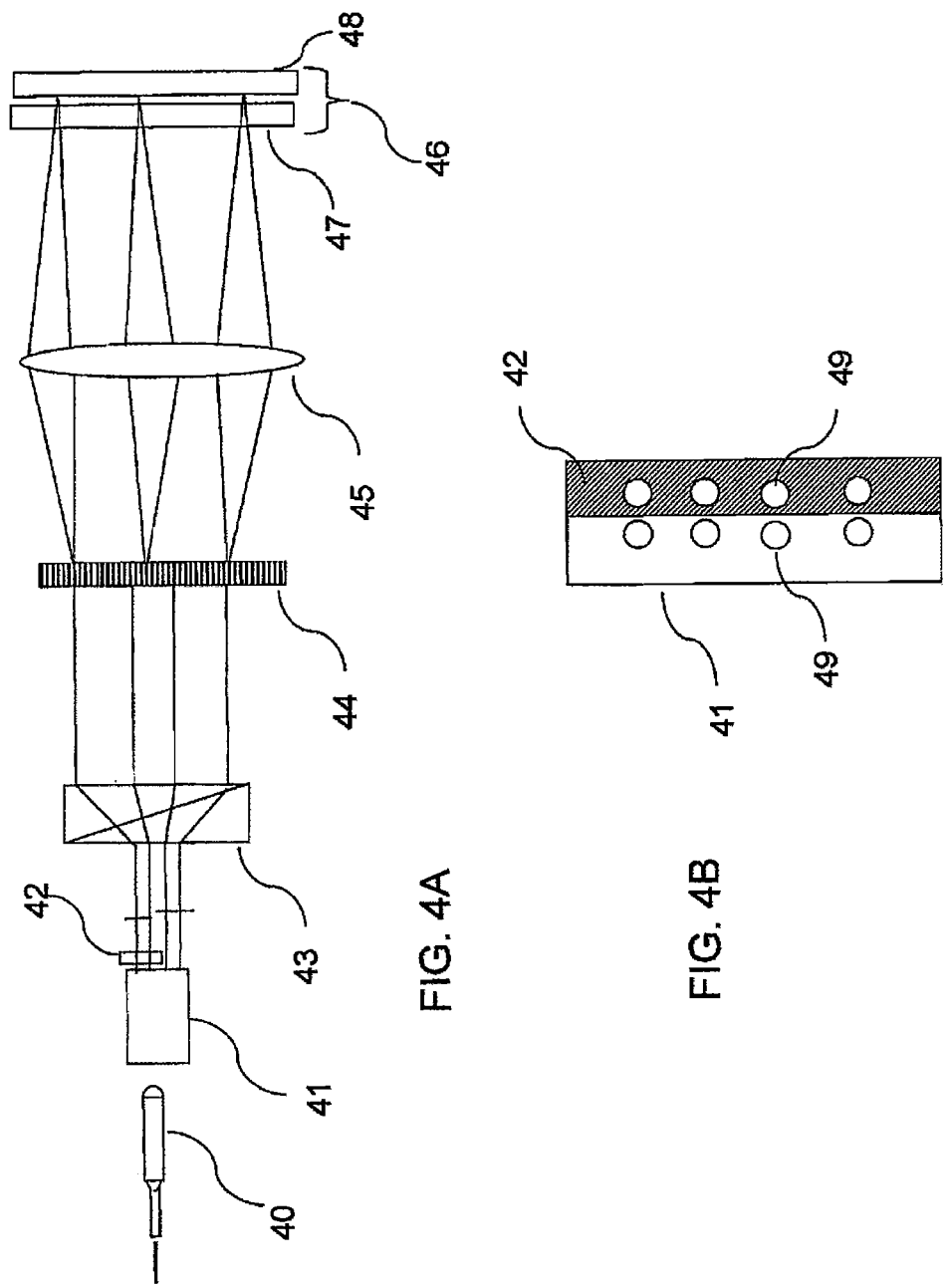
FIGS. 4A and 4B are more schematic views of the reflective wavelength selective router of FIG. 3, showing the component parts in more detail.

Reference is now made to FIG. 4A, which is another schematic plan view of the reflective wavelength selective router of FIG. 3, showing the component parts in more detail. FIG. 4A shows the plan view layout of a single channel path of the router. The input (or output) beam of each port is input (or output) at the fiber interface block, which preferably comprises a fiber collimator 40 per port, followed by a birefringent walk-off crystal 41, such as a YVO$_4$ crystal, preferably having a half wave plate 42 over part of its output face. The output of each channel thus comprises a pair of beams having the same polarization direction, as indicated by the vertical line on each of the beam outputs, and disposed in a predetermined plane, which, in the example shown in FIG. 4A, is in the plane of the drawing. After this polarization decomposition and conversion, these beams are then laterally expanded in that same predetermined plane, in the preferred example shown in FIG. 4A, by an anomorphic prism pair 43. These laterally expanded beams are passed to the grating 44 for wavelength dispersion, again in the same predetermined plane, which, in the example shown in FIG. 4A, is in the plane of the drawing. The dispersed wavelength components are then directed to the lens 45 for focusing on the beam switching and steering module 46. The beams of each wavelength channel are first switched by the pixilated liquid crystal (LC) array 47, to achieve the desired transmission state for that channel, either a blocked, or a fully transmitted or an attenuated transmission state. After the appropriate beam processing by the LC array, the beam is then passed to the beam steering device 48, shown in FIG. 4A as a reflective element, operative to reflect each switched and steered beam back down the router to the output positions of the birefringent crystal, and from there to the respective output collimator ports. This steering is performed in the direction perpendicular to the plane of the drawing. According to one preferred embodiment, the beam steering device may be a MEMS array of mirrors. The birefringent walk-off crystal 41 with its half-wave plate 42, is shown on a larger scale and in end view in FIG. 4B, where the beam positions can be seen after decomposition of each input beam into the two polarization-defined side-by-side beams 49. In the embodiment shown in FIGS. 4A and 4B, the beam steering is performed out of the plane of the drawing, hence the vertical line of beams seen in FIG. 4B, one pair for each channel. As previously stated, a similar transmissive embodiment can equally be implemented, in which case the reflective elements 48 are replaced by a transmissive steering element embodiment, with the above mentioned input elements of the device repeated to the right of the beam steering device to deal with the outputting of the transmitted beams.

Figure 5A:
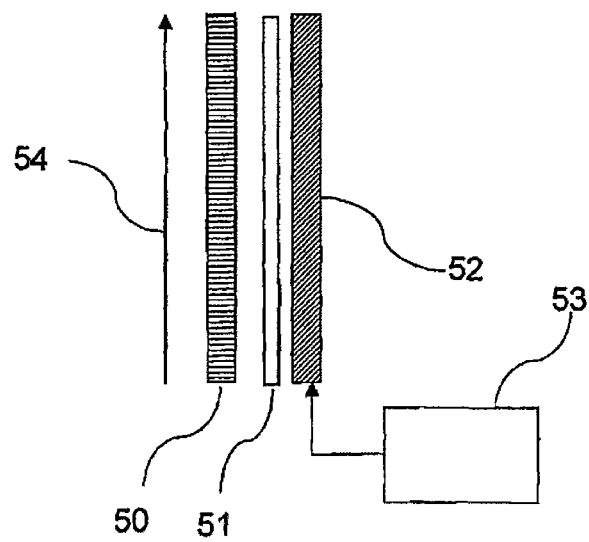
FIGS. 5A and 5B are schematic views from top and side of a MEMS based beam steering focal plane module for use in the router of FIG. 3.
Figure 5B:
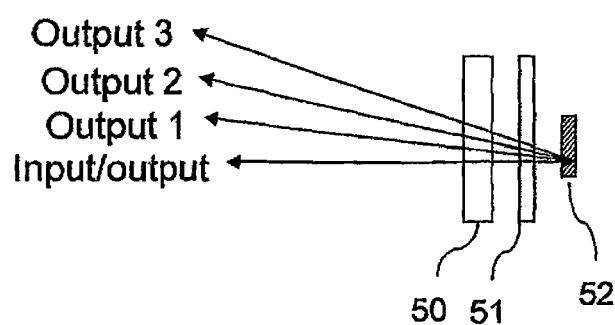

Reference is now made to FIGS. 5A and 5B, which are schematic views respectively from the top and side of a preferred embodiment of the beam steering focal plane module of the previous drawings, in the form of a MEMS array, for use with a single input channel of a WSS of the present invention. In FIG. 5A there are seen (i) the LC polarization rotation array 50, pixilated in the direction 54 of the wavelength dispersion, and responsible for selecting the desired transmissive, blocked or attenuated state of each wavelength channel, (ii) an optional linear polarizing element 51, whose function is to increase the extinction ratio of the polarization selection combination in the system, and thus to improve the blocking, and (iii) a one-dimensional MEMS array of mirrors 52, each of the MEMS mirrors being aligned directly behind a corresponding pixel of the LC array. The MEMS array mirrors reflectively steer the beam from each pixel back through that pixel, but at a steered angle out of the plane of the drawing, each pixel according to the setting of the MEMS control 53 for each mirror of the array.

FIG. 5B shows the same arrangement as that of FIG. 5A, but from a side view, i.e., looking along the dispersion direction, so that the different steering angles to the differently labeled output ports 1 to 3 can be shown. In the example shown in FIG. 5B, the input port, labeled I/O, can also be utilized as an output port by incorporation of a circulator at the input/output port of the router, as is known in the art. The additional three outputs shown can be used as Drop ports, though functionally, since they operate no differently from the input/output port shown, this is merely a matter of nomenclature, and the device is essentially reciprocal.

In the MEMS configuration illustrated in FIGS. 5A and 5B, a problem may arise during beam steering from one output to another because the MEMS element sweeps the beam into positions providing outputs where they are not requested. Thus for example, in FIG. 5B, when the beam of any particular wavelength is steered between outputs 1 and 3, it will momentarily cross output 2, generating a spurious signal therein.

Reference is now made to FIGS. 5C to 5E which illustrate schematically another preferred embodiment of the present invention, which avoids this phenomenon, and provides what is known as a hitless beam steering configuration.

Referring first to FIG. 5C, which illustrates prior art switching methods, switching the beam from the port labeled input/output to output 3 involves traverse of output ports 1 and 2, with resulting spurious signals thereto. Furthermore, in such systems which utilize only single-direction beam steering, without the polarization rotation attenuation effects of the present invention, attenuation of the transmitted beam is achieved by directing the transmitted beam 55, so that it does not completely overlap the destination port 56, thereby coupling in only part of the signal. This, however, has the drawback that the band pass shape of the beam changes with the attenuation level.

Reference is now made to FIG. 5D, which illustrates a method by which prior art switches can overcome the problem of spurious signals. By using a two dimensional beam steering device, such as a MEMS mirror array having two axes of rotation for each mirror pixel, the beam can be deflected though a path 57 such that it will not illuminate in the direction of any other output port before reaching its target port 56. However, such a twin steered axis MEMS array is more costly to manufacture and incorporate, and more difficult to control, than a single steered axis MEMS array. Furthermore, when no polarization rotation attenuation is used, the same disadvantage arises as was described in connection with the embodiment of FIG. 5C.

Reference is now made to FIG. 5E, which illustrates a method by which the beam steering configuration of the WSS of the present invention, is able to overcome both of these drawbacks of prior art methods, and without forgoing the use of a simple one dimensional MEMS mirror array with single axis steering. In the configuration of FIG. 5E, the switched beam is steered directly between the input port and the destination port 56, but while the beam is passing over the intermediate ports during the switching process, the beam transmission is blocked by controlling the settings of the LC polarization rotation pixels associated with the particular wavelength component being switched. As soon as the switching process is over, and the beam path connection to the desired destination port is completed, the transmission can be unblocked and the switch can operate as programmed. The blocked paths to the undesired ports are shown schematically in FIG. 5E by the blocking patch 58. By this means, the problem of spurious signals can be overcome.

Furthermore, use of the polarization rotation attenuating elements of the present invention, allows the switched beam 55 to couple completely into its destination port 56, and any desired attenuation can be achieved by adjustment of the LC pixel setting to control the channel attenuation directly. In this way, the band pass shape distortion associated with the switching schemes of FIG. 5C and FIG. 5D is also avoided.

Figure 6A:
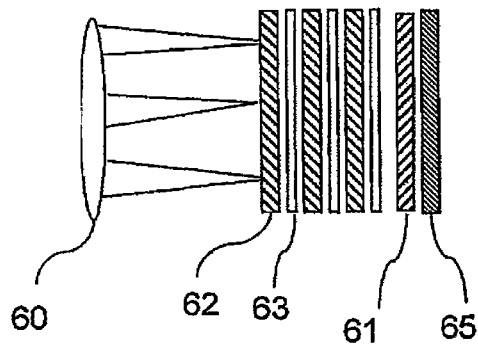
FIGS. 6A and 6B are schematic views from top and side of a liquid crystal/birefringent prism based beam steering focal plane module for use in the router of FIG. 3.
Figure 6B:
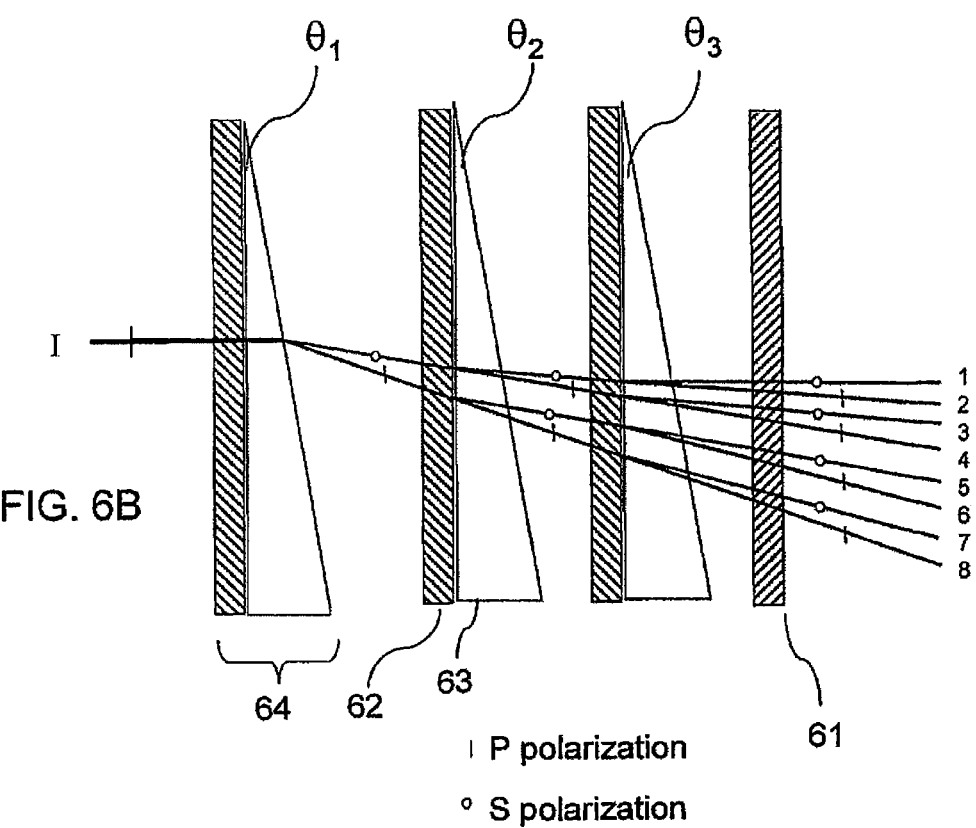

Reference is now made to FIGS. 6A and 6B, which are schematic views respectively from the top and side of an LC/birefringent-prism based beam steering focal plane module, constructed and operative according to a further preferred embodiment of the present invention. For illustrative purposes only, the FIG. 6A embodiment is shown as a reflective configuration, while that shown in FIG. 6B is transmissive, though it is to be understood that either configuration may be used as a reflective or transmissive embodiment. In FIG. 6A, there is shown the focusing lens 60 of the router directing the beams towards the focal plane switching and steering array. The switching function itself, namely the decision as to whether a particular wavelength channel is transmitted, attenuated or completely blocked, is preferably performed by the last LC element 61, which is pixilated, while the steering is performed using alternate pixilated LC crystals 62 and birefringent prismatic crystals 63, referred to hereinafter as LC/prism pairs, which are arranged serially in the beam paths. Each birefringent prismatic crystal deflects a beam impinging thereon by an angle which is dependent on whether the beam has s- or p-polarization, and the determination as to whether the beam impinging on a certain pixel has s- or p-polarization can be selected by applying the appropriate control voltage to the preceding LC pixel for that channel. Since each prism preferably selects one of two steering angles (assuming that the LC is driven to generate polarization rotations of) 90°, then the number of possible steering angles becomes $2^n$, where n is the number of LC/prism pairs used in the router. Thus for three LC/prism pairs, 8-way steering is possible. In FIG. 6A, a mirror 65 is shown after the assembly to reflect the output beams back through the router.

In the plan view of the steering focal plane module of FIG. 6A, the beam deflection angles are into or out of the plane of the drawing, such that the differently directed beams are not discernible. Reference is now made to FIG. 6B, which is a schematic side view of the preferred transmissive LC/prism focal plane steering array shown in plan view in FIG. 6A, showing the different directions into which the module directs the input channel. Each of the three LC/prism pairs 64 can steer the beam into one of two different directions, depending on the beam polarization, such that 8 different steered directions are provided with the three stages shown. Birefringent prisms 63 rather than slabs are used in order to ensure that each of the birefracted beams is directed towards a different angle, ensuring channel separation between ports. Furthermore, each prism should preferably have a different wedge angle, $\theta_1, \theta_2, \theta_3$, to ensure compete angular separation of the steered beams from each stage, regardless of whether birefracted or not. The LC element 61 for selecting the switching status is preferably disposed either before or after (as shown in FIGS. 6A and 6B) the beam steering assembly, but not within the beam steering module, in order to avoid interference of the beam steering by the polarization changes caused by the switching element, which would cause channel cross-talk.

TABLE I

| Input | | Output after 1st LC | Output after 2nd LC | Output after 3rd LC |
|---|---|---|---|---|
| P | Beam to port 1 | S | S | S |
|   | Beam to port 2 | S | S | P |

Reference is now made to Table I, which shows the polarization states of outputs 1 and 2 of the preferred transmissive embodiment of FIG. 6B, for a situation where the switching LC 61 after the beam steering module is set to provide no additional polarization change in any output beam, i.e., all the beams are fully transmitted. For a p-polarization input beam, and for the illustrated settings of the LC beam steering cells shown in FIG. 6B, in which the p-polarization is deflected more than the s-polarization beam, the output at port 1 has an s-polarization, whereas that at port 2 has a p-polarization. Therefore, it is apparent that since the beam steering module generates polarization changes in the output signal polarizations, quite separately from the polarization changes engendered by the switching process LC, a low polarization dependent loss (pdl) grating must be used in these embodiments, to ensure that the dispersive element can handle beams of differing polarization. The outputs to the other ports 3 to 8 in Table I can be similarly displayed.

TABLE II

| Input | | After: | | | | Before: | | | Output |
|---|---|---|---|---|---|---|---|---|---|
|  |  | LC1 | LC2 | LC3 |  | LC3 | LC2 | LC1 |  |
| P | Beam to port 1 | S | S | S | MIRROR | S | S | S | P |
|   | Beam to port 2 | S | S | P | MIRROR | P | S | S | P |

Reference is now made to Table II, which shows the polarization states of outputs 1 and 2 of the preferred reflective embodiment of FIG. 6A, again for a situation where the switching LC after the beam steering module is set to provide no additional polarization change in any output beam. For a p-polarization input beam, and for the same settings of the LC beam steering cells as those shown in FIG. 6B, the incident polarization at the mirror 65 for the beam destined for output port 1 is s-polarization, whereas that destined for port 2 has a p-polarization. However, since the beams are now reflected by the mirror, they return in a reverse path back to the input of the beam steering module, which is now the output of the beam steering module, and undergo the opposite polarization changes in the return path to those that they underwent in the incident path. As a result, each reflected output beam has the same polarization as that of the incident beam, and the beam steering module itself does not generate any polarization changes in the output signal polarizations. Thus for a fully transmitted signal, where the switching LC 61 does not introduce any other polarization changes, a high efficiency grating can be used to handle the like-polarized transmitted beams of all of the channels.

Figure 7A:
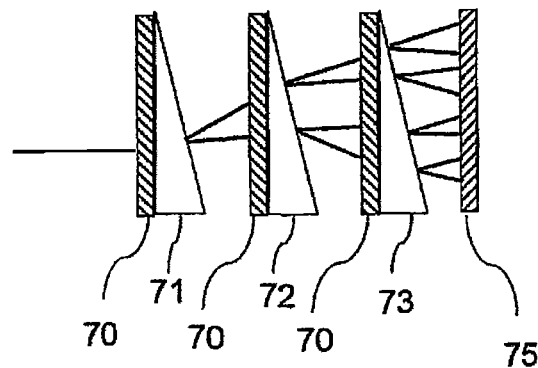
FIGS. 7A and 7B are schematic views of two transmissive beam steering modules, similar to those illustrated in FIG. 6B, but showing different wedge dispositions.
Figure 7B:
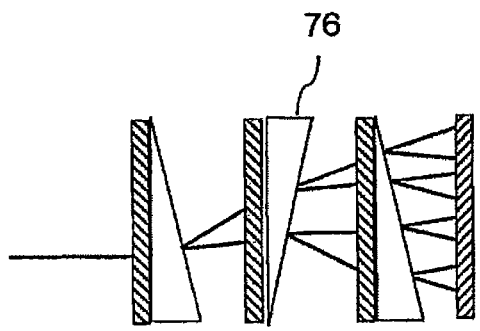

Reference is now made to FIGS. 7A and 7B, which are schematic views of two alternative and preferred transmissive beam steering modules, similar to those illustrated in FIG. 6B, having liquid crystal cells 70 with associated birefringent crystal prisms, 71, 72, 73, each prism having a different wedge angle, and a switching liquid crystal transmission element 74, but showing how, in FIG. 7B, the orientation of the wedge of the various prisms can be varied compared with that of FIG. 7A, without affecting performance. In the example shown in FIG. 7B, one of the prisms 76 is aligned such that it deviates the beams in the opposite direction to that of the other prisms. All that is required is that the chosen deflection angles should provide clear beam separation between output ports.

Figure 8A:
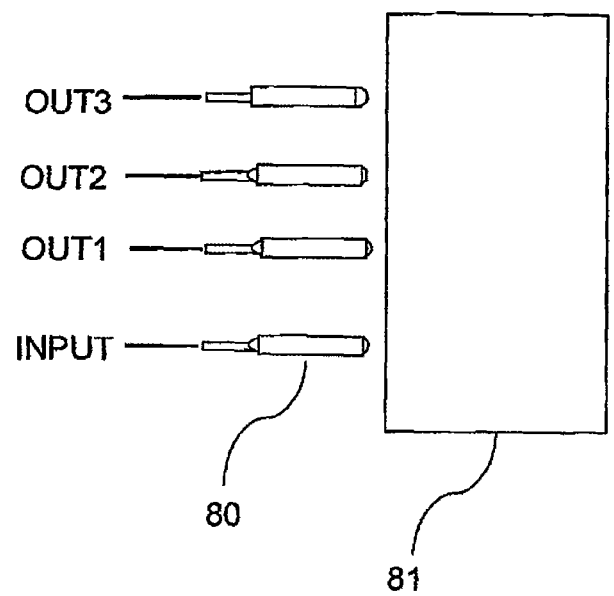
FIGS. 8A and 8B are schematic illustrations from side and front, of the fiber interface module of the router according to a preferred embodiment of the present invention.
Figure 8B:
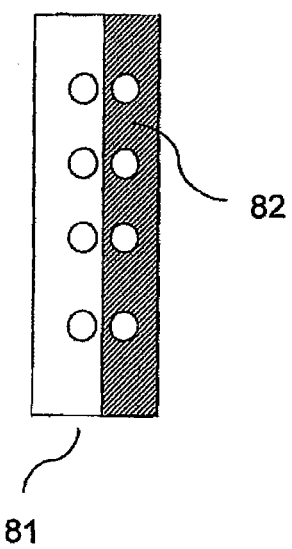

Reference is now made to FIGS. 8A and 8B, which are schematic illustrations of the fiber interface and polarization conversion module, according to a further preferred embodiment of the present invention. FIG. 8A is a side view, with the input and output fiber collimators 80 shown directing their beams at the birefringent polarization converter 81, which is preferably shown as a $YVO_4$ crystal. In FIG. 8B is shown a front view of the birefringent crystal 81, showing the array of beams exiting the birefringent crystal, a pair from each collimator, with a half wave plate 82 covering one side of the outputs of the birefringent crystal in order to rotate the polarization of one set of these output beams by 90.degree. such that both beams of any port have the same polarization, as is known in the art.

Although the optical signals are schematically shown in FIG. 8A as being input or output from an array of single fiber collimators, it is to be understood that any other methods known in the art for inputting or outputting a plurality of signals can also be used in the present invention. An important feature of the input/output arrangement is that the optical channels be spaced as close as possible, in order to provide the most compact router as possible, with concomitant savings on component costs, and with increased packaging density for the routers in a communication system. Thus, it is possible to use a V-groove array to provide closer packing, either with a microlens array, or with a single lens for all of the inputs/outputs. Similarly, a waveguide input device can be used, in which the fiber inputs/outputs are brought closer together in a monolithic waveguide structure, such as can be fabricated in a silicon substrate. Even closer spacings can be achieved by this means.

Figure 9:
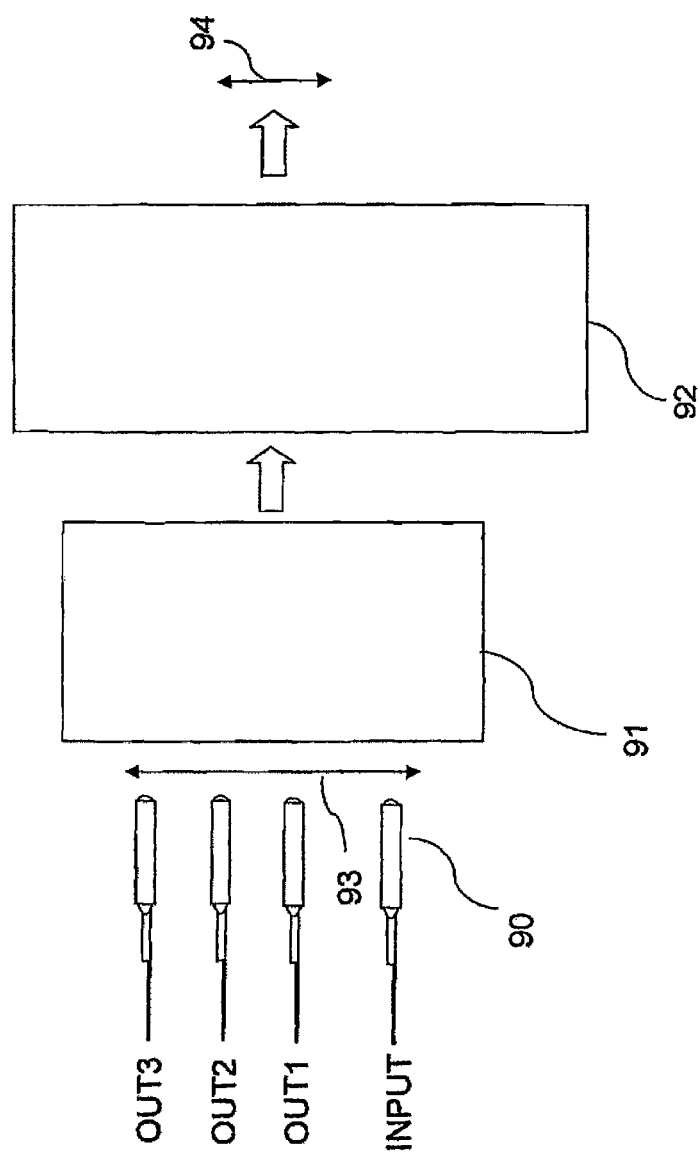
FIG. 9 is a schematic side view of the fiber interface input module shown in FIG. 8A, but including an inverse telescope for demagnifying the height of the array of input beams.

Reference is now made to FIG. 9, which is a schematic side view of the fiber interface input and polarization conversion module 90, 91, shown in FIG. 8A, but including an inverse telescope 92 for demagnifying the height of the array of input beams. This demagnification is in the plane generally orthogonal to that in which the lateral beam expansion takes place. Such demagnification is preferable used because the physical size of the input fiber collimators makes their spacing significantly larger than that required in the other optics modules of the router. The original height 93 of the beam array exiting and entering the collimator array 90 is reduced to a beam height 94 of significantly smaller dimensions for directing into the remainder of the router components, thus enabling the achievement of a more compact router geometry than would be achieved without such beam demagnification.

Figure 10:
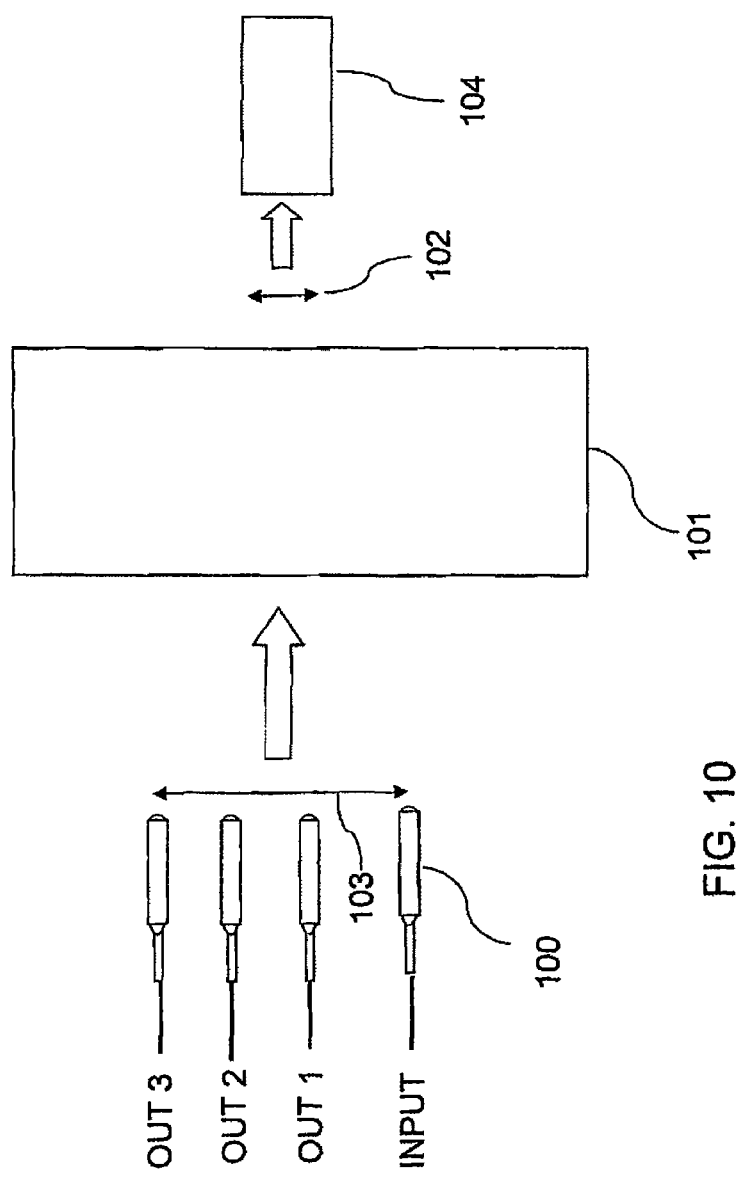
FIG. 10 is a schematic side view of an alternative configuration for the location of the inverse telescope of the fiber interface input module of FIG. 9.

Reference is now made to FIG. 10, which is a schematic side view of an alternative configuration of the fiber interface input module shown in FIG. 9. In this preferred embodiment, the inverse telescope 101 for demagnifying the height 103 of the beam array, is positioned before the input to the polarization conversion birefringent crystal 104, such that this crystal too, along with the rest of the router components, can have reduced height commensurate with the reduced height 102 of the demagnified beam.

Figure 11A:
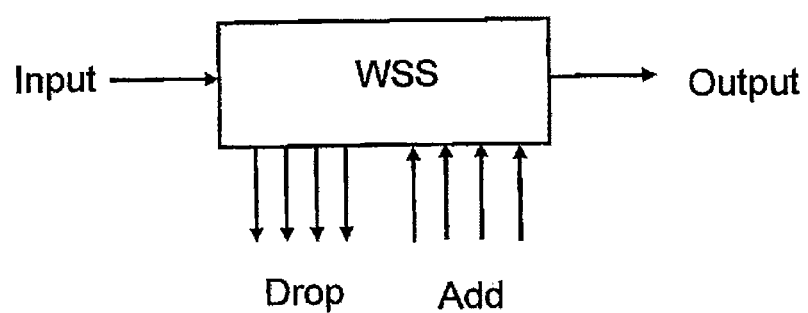
FIGS. 11A and 11B illustrate a schematic wavelength selective Add/Drop router module, constructed and operative according to a further preferred embodiment of the present invention, using beam steering.
Figure 11B:
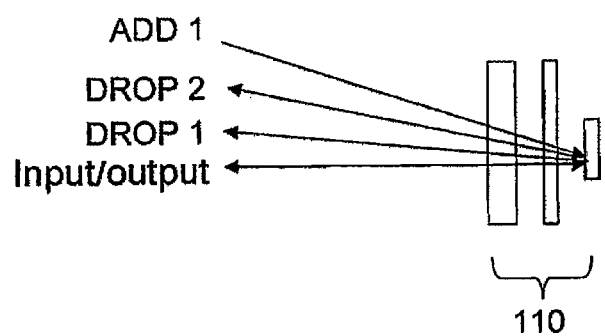

Reference is now made to FIGS. 11A and 11B, which illustrate a schematic wavelength selective Add/Drop router module, constructed and operative according to a further preferred embodiment of the present invention. FIG. 11A is a block diagram of the functionality, while FIG. 11B shows the implementation of the beam steering in such a system using MEMS mirrors. This Add/Drop router uses beam steering modules 110 such as those described in any of the various embodiments previously described in the present application. A circulator (not shown in FIG. 11B) is required at the main input/output port, in order to separate the input from the output signals in reflective embodiments. In such a case, the difference between an Add port and a Drop port is essentially one of nomenclature only, since the optical path between the input/output port and each of the Add or Drop ports is determined only by the beam switching and the beam steering commands, and these can be selected as desired.

Figure 12:
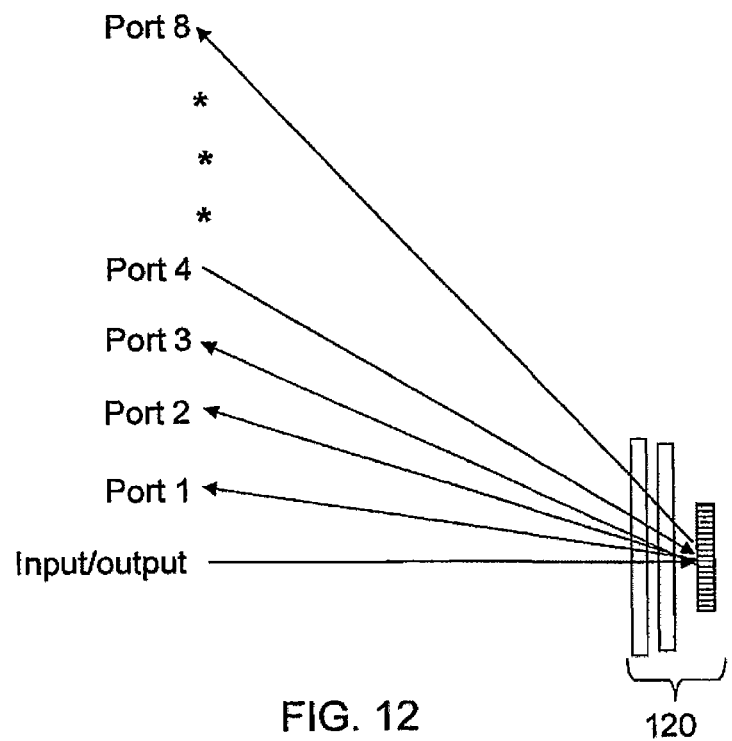
FIG. 12 shows the different steering angles generated by a MEMS mirror, directing the beam between the input/output port and any of the other ports of the router of FIGS. 11A and 11B.

This feature is illustrated schematically in FIG. 12, which shows the different steering angles generated by a MEMS mirror array 120, directing the beam between the input/output port and any of the other ports. The decision as to whether any port is called an Add or a Drop port is determined only by the direction of the signal being transmitted, whether into or out of the selected port.

It is also feasible to construct an Add/Drop router, according to a further preferred embodiment of the present invention, without the need for a circulator, using separate input and output ports, each of which utilizes a separate steered angle in the beam steering module. However, in this case, the control and programming of the beam steering array is significantly more complex, since the beam steering module then has to be programmed so that each port can be connected to any of the other ports. This also makes the accuracy of aiming of the MEMS mirrors significantly more critical, to ensure providing sufficient angular steering resolution for the increased number of steering angles required.

In the previously described MEMS embodiments of the beam steering module, the MEMS devices have been mirror arrays in a reflective embodiment of the router, with the output beams traversing essentially similar paths to those of the input beams, and passing through the same components as were used for the input beams.

Figure 13:
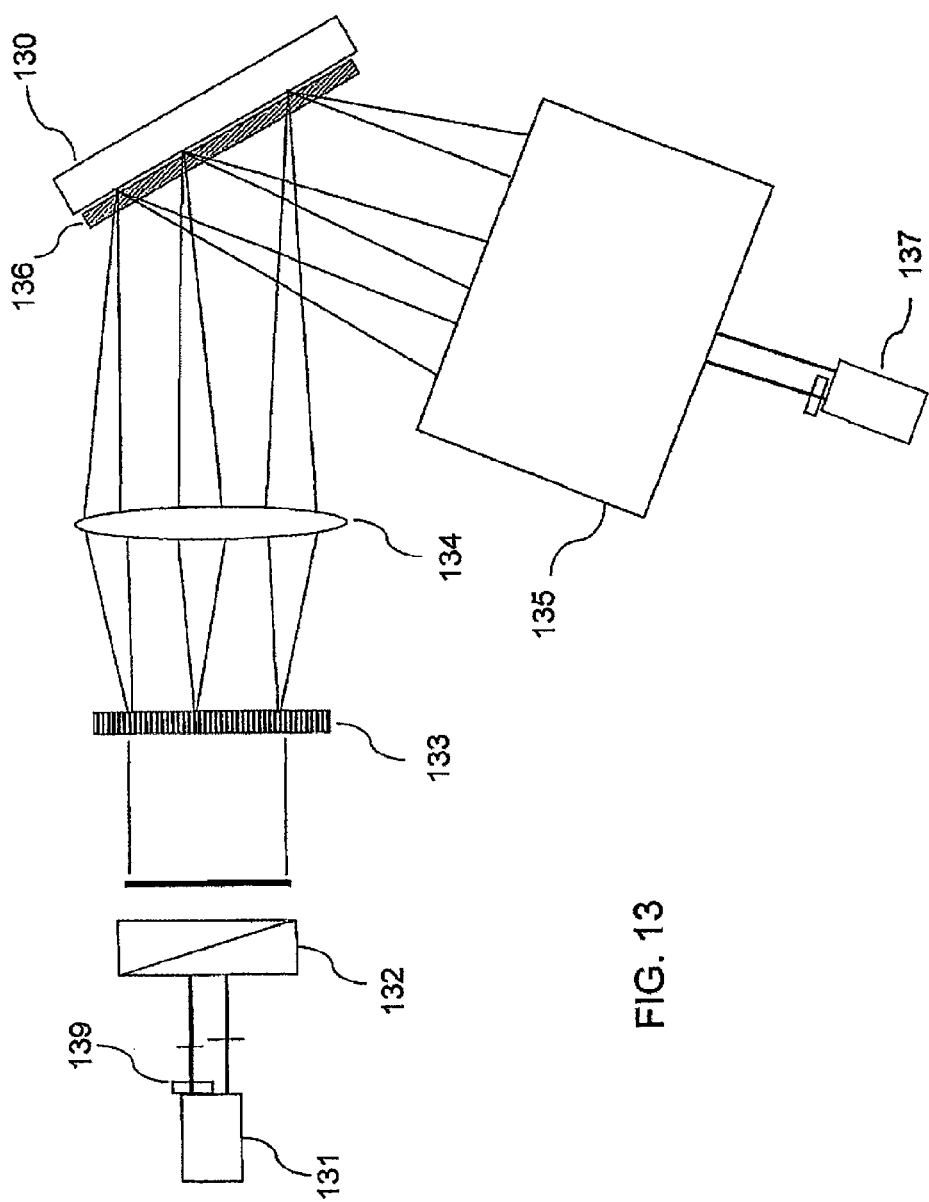
FIG. 13 illustrates a further preferred embodiment of the present invention, in which MEMS devices, based on reflection from mirrors, are used in a transmissive embodiment of the router of the present invention.

Reference is now made to FIG. 13, which illustrates a further preferred embodiment of the present invention, in which MEMS devices, based on reflection from mirrors, are nevertheless used in a transmissive embodiment of the router, in the sense that the input and output sections of the router are spatially distinct. The WSS shown in FIG. 13 comprises an input section, similar to that shown in the embodiment of FIG. 4A, with a fiber collimator followed by a birefringent walk-off crystal 131 with a half wave plate 139 over part of the output face, a beam expansion prism 132, a dispersive element 133, and a focusing lens 134 for focusing the beams onto a beam switching and steering module preferably comprising an LC device 136 and a MEMS array 130. However, unlike the embodiment of FIG. 4A, the steering module of FIG. 13 is aligned at an angle significantly different from normal incidence, such that the beams reflected from the MEMS mirrors are diverted in a direction away from the input optics path, and towards a completely separate set of optics components 135, generally equivalent to those used on the input side, and acting as an output optics system. As previously, the individual MEMS mirrors 130 are tilted at small angles around the average alignment direction, in order to steer individual beams along their desired path and to the on the output section 137 of the router. The output optics system can be either horizontally or vertically displaced from the input plane, depending on the geometrical configuration preferred, and on the feasibility of that geometrical configuration.

Figure 14:
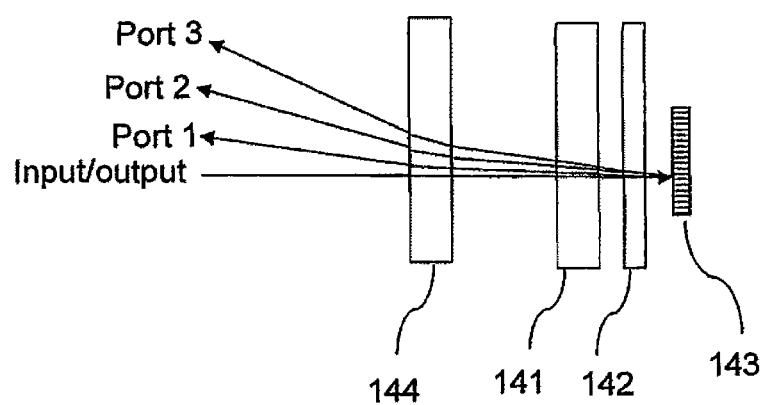
FIG. 14 illustrates yet a further preferred embodiment of the beam steering module for use in the reflective embodiments of the present invention using a phased array liquid crystal-on-silicon (LCOS) device.

Reference is now made to FIG. 14, which illustrates a further preferred embodiment of the beam steering module for use in the reflective embodiments of the present invention. According to this embodiment, the beam steering can be generated by use of a phased array liquid crystal-on-silicon (LCOS) device, with a phased linear array for each wavelength component. The linear phased array is then programmed to direct the beam to the direction desired for that wavelength according to the phase shifts applied to the various pixels in the phased linear array for each wavelength. A complete 2-dimensional LCOS array is then able to direct all of the wavelength channels of the device.

In FIG. 14, there is shown a schematic representation of a single wavelength channel of an LCOS beam steering assembly. The assembly preferably comprises a pixilated liquid crystal polarization rotation array 141, for selecting the desired transmissive, blocked or attenuated state of each wavelength channel, an optional linear polarizing element 142 to increase the extinction ratio of the polarization selection combination in the system, and an LCOS array 143 preferably comprising a thin layer of liquid crystal material disposed on top of a pixilated CMOS driving array, for reflectively steering the beam from the specific wavelength pixel shown in FIG. 14 back through that pixel, at a selected steered angle. The steered angle is dependent on the field applied to the LC elements of the phased array by the CMOS pixels in the LCOS array, each field generating a different phase shift in the light passing through the LC layer of the LCOS array. The arrangement of successive phase shifts in the array defines the steered angle, as is known in phased array technology.

According to another preferred embodiment of the LCOS beam steering phased array, it is possible to forgo the need for the separate pixilated liquid crystal polarization rotation array 141, and to perform both the attenuation and steering functions by means of the LC layer on the LCOS array. The desired attenuation can be achieved either by adjusting the reflected phase pattern to be less than optimal, such that part of the incident beam is not specularly reflected from the LCOS array, and the switched beam is thus attenuated as well as being steered, or by using optimal efficiency phased array steering, but adjusting the steering direction slightly so that the output beam does not fully overlap the output port, so that only part of the output beam is coupled out, as shown in the embodiments of FIGS. 5C and 5D. This embodiment leads to a simple beam steering module, although the control thereof is more complex.

In the preferred embodiment of FIG. 14, the beam steering module is shown with one input port and 3 output ports, though, as previously explained in relation to the MEMS embodiments of the present invention, this division is nominal, and any port can be used for any function, whether input or output. The beam steering arrays for the other wavelength channels to be handled by the WSS are disposed in the direction perpendicular to the plane of the drawing of FIG. 14.

The steering angles achievable with such an LCOS phased array are very small, generally of the order of a very few tenths of a degree. In FIG. 14, the deflection angles have been exaggerated, in order to render the operation of this embodiment visible. It is therefore generally difficult to use an LCOS beam steering array in practice without an auxiliary beam deflecting component 144, whose function is to increase the beam deflection angle so that the deflected beams can be resolved, and the beam steering array can be practically used. Such a deflection amplifying device can preferably be constructed using a diffractive optical element (DOE) or a holographic element, or a sequential series of reflecting surfaces, each successive reflector doubling the deflection angle achieved, or a divergent prism arrangement, though it is to be understood that the invention is not meant to be limited to these solutions.

Any of the above described embodiments of the WSS of the present invention can include a number of auxiliary functions which increase the usefulness of the device in practical systems. Channel power monitoring can be performed by splitting off a small percentage of the beam power, preferably at the output or drop ports, and this power coupled out can be directed onto an array of detectors which are used for determining the output power in each channel. Additionally, in those embodiments using a flat array of fibers as channel inputs, the signals can be input to the WSS at predefined lateral positions by using a V-groove input block, as is known in the art. Furthermore, a silicon waveguide array can be used at the input, with channels spaced as close as 9 microns from each other, thus reducing the size of the device. Use of a microlens array for focusing the input beams can then be advantageous.

Figure 15:
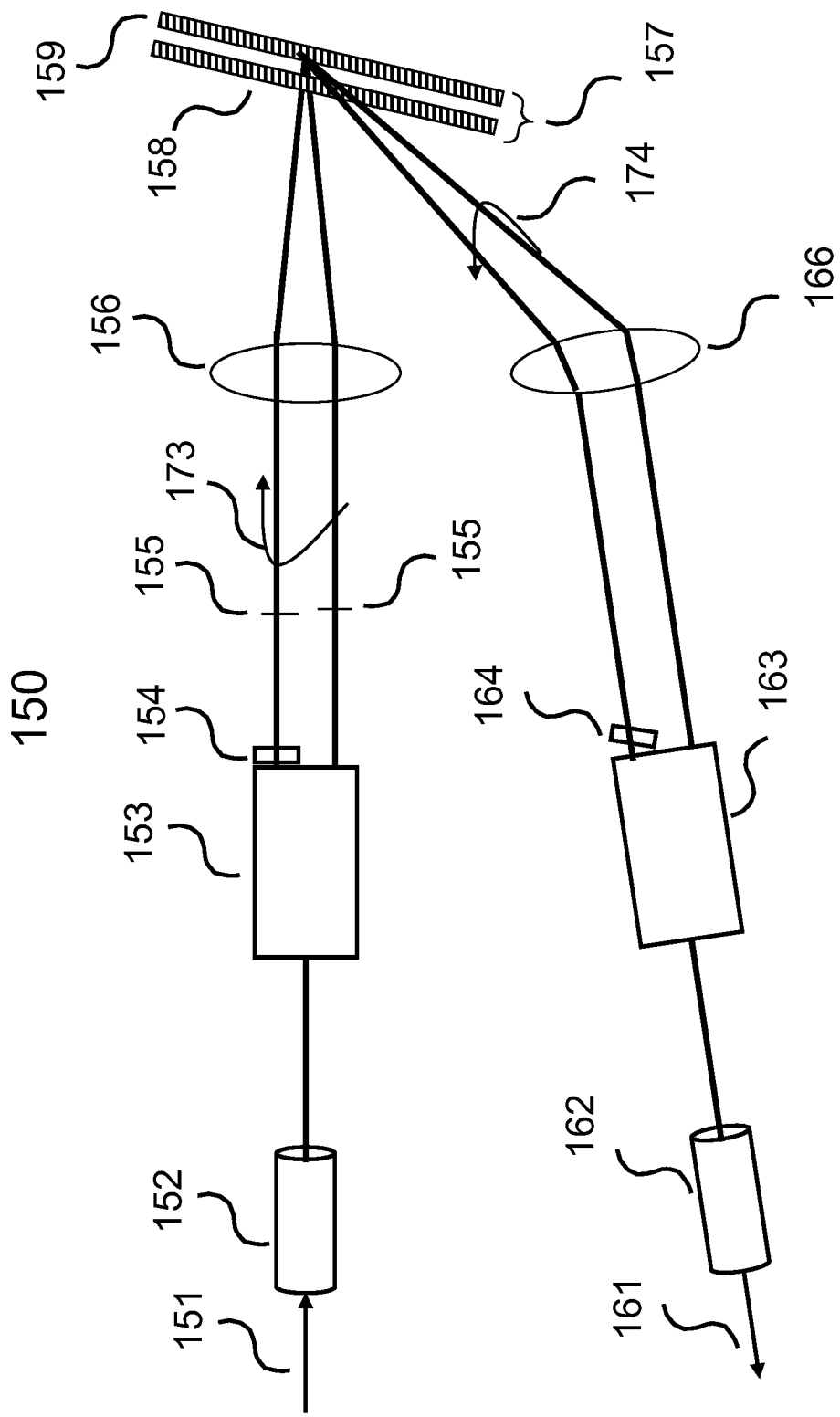
FIG. 15 is a schematic plan view of a multi-pole optical signal switch according to one or more embodiments of the present invention.

Reference is now made to FIG. 15, which schematically illustrates a plan view 150 of one exemplary implementation of an optical switch according to an embodiment of the present invention. In this implementation any number of input signals each received at a different input port, may be directed towards any of the output ports. It is generally assumed that the input and output signals may include a WDM signal or a multi-pole optical beam. The optical switch accepts a plurality of input signals arriving at different input ports and converts them into free space collimated beams for focusing, polarization, and spatial manipulation.

For clarity, only one input signal 151 and one input port 152 of the optical switch are shown and labeled in the plan view where the input signal 151 is shown coupled to the optical switch via a fiber interface 152. A polarization selection module 153 with a half wave plate 154 covering part of the polarization selection module, adjusts the polarization state of the free space beam. The polarization selection module generates a pair of beams 173 (hereinafter input beam pair) with substantially the same predefined polarization state in a predetermined plane (shown as vertical lines 155). Regardless of the polarization state of the input beam, the input beam pair has substantially similar predetermined polarization state in the optical switch. A predetermined polarization state so applied allows controlled attenuation of the beam pairs at the output ports, by applying a predetermined polarization rotation. A focusing element 156 focuses the input beam pair onto a pixilated beam steering module 157.

The beam steering module 157 comprise two parts—a pixilated one-dimensional array of beam steering elements 159 and a pixilated one-dimensional array of polarization control elements 158. In this exemplary configuration, the beam steering array 159 and the polarization control array 158 are located in two different optical paths. However, it is not necessary to be so in other configurations that will be apparent to those skilled in the art. Each beam steering array comprises a plurality of pixels (hereinafter beam steering pixel) that are independently tiltable along a single rotation axis in response to a control signal. Each beam steering pixel deflects the incident input beam pair preferably in a plane perpendicular to the plane of the drawing and towards a specific output port 162 selected in accordance with the tilt applied to the beam steering pixel. In this manner, any input beam pair can be directed to a desired one of the output ports.

The deflected beam pair 174 impinges upon a pixel of the polarization control array (hereinafter polarization control pixel). Each polarization control pixel in response to a respective control voltage proportionally rotates the polarization of the input beam pair impinging thereupon. The polarization control array applies rotation to the input beam pair in accordance with the predetermined polarization state set by the polarization selection module. The deflected beam pair 174 after undergoing polarization rotation is collimated by a second focusing element 166. The second focusing element 166 directs the deflected beam pair through a polarization conversion module 163.

A half-wave plate 164 covers a part of the polarization conversion module on the side where the deflected beam pair is incident on the module. The polarization conversion module is similar to the polarization selection module configured in reverse and functions in a complementary mode as compared to the polarization selection module. The polarization conversion module at the output port is set to receive signal having a predetermined polarization state. In one exemplary embodiment, the polarization conversion module is set to allow signals having the same polarization state as the input beam pair, to pass and generate an output signal. Deflected beam pairs arriving at the polarization conversion module with their polarization states rotated from the polarization state of the input beam pair, are not allowed to pass. Accordingly, no output signal is generated thereby, attenuating the deflected beam pair at the output port. The degree of attenuation is proportional to the amount of polarization rotation applied in the polarization control array.

For example, if a polarization control pixel of the array does not apply any rotation to the deflected beam pair (total rotation equals 0°), the deflected beam pair arrives at the polarization conversion module of an output port in the same polarization state as during its transmittal, and thereby passes to the selected output port without attenuation. In this manner, the input beam pair deflected by the beam steering device towards a selected output port, exits out of the selected port as an output signal. On the other hand, if a polarization control pixel applies a 90° rotation the beam pair arrives at the polarization conversion module of the output port in a polarization state that is different from the polarization state of the input beam pair during its transmittal, and thereby does not pass through the polarization conversion module and experiences a full attenuation set by the extinction ratio of the system. Any amount of attenuation may be applied in one or more steps. For example, in another exemplary arrangement, the polarization control array may be disposed in a path such that the beam pair passes the polarization control pixels twice, once each before and after being deflected by the beam steering pixel. In this configuration, the polarization control pixel rotates the beam by 45° in each pass to achieve full attenuation. Intermediate configurations may provide any level of attenuation desired. For example, in other exemplary embodiment two polarization control arrays may be disposed in the beam pair path such that each polarization control array applies a predetermined amount of polarization rotation in each pass to achieve full attenuation. These and other arrangements will be apparent to those skilled in the art within the scope of the disclosure of the present invention.

While only one polarization conversion module is shown in FIG. 15, there is an array of similar elements, each one corresponding to an output port. The polarization conversion module combines each deflected beam pair into an output beam. The polarization conversion module is similar in structure as the polarization selector module except it is configured to operate in a complementary mode. The polarization conversion module 163 combines the deflected and polarization rotated beam pairs 174 into an output beam and, directs the output beam to a selected output port 161 via an output collimator 162. As described above, the selection of the output port is determined by the amount of deflection applied in the beam steering module.

Figure 16:
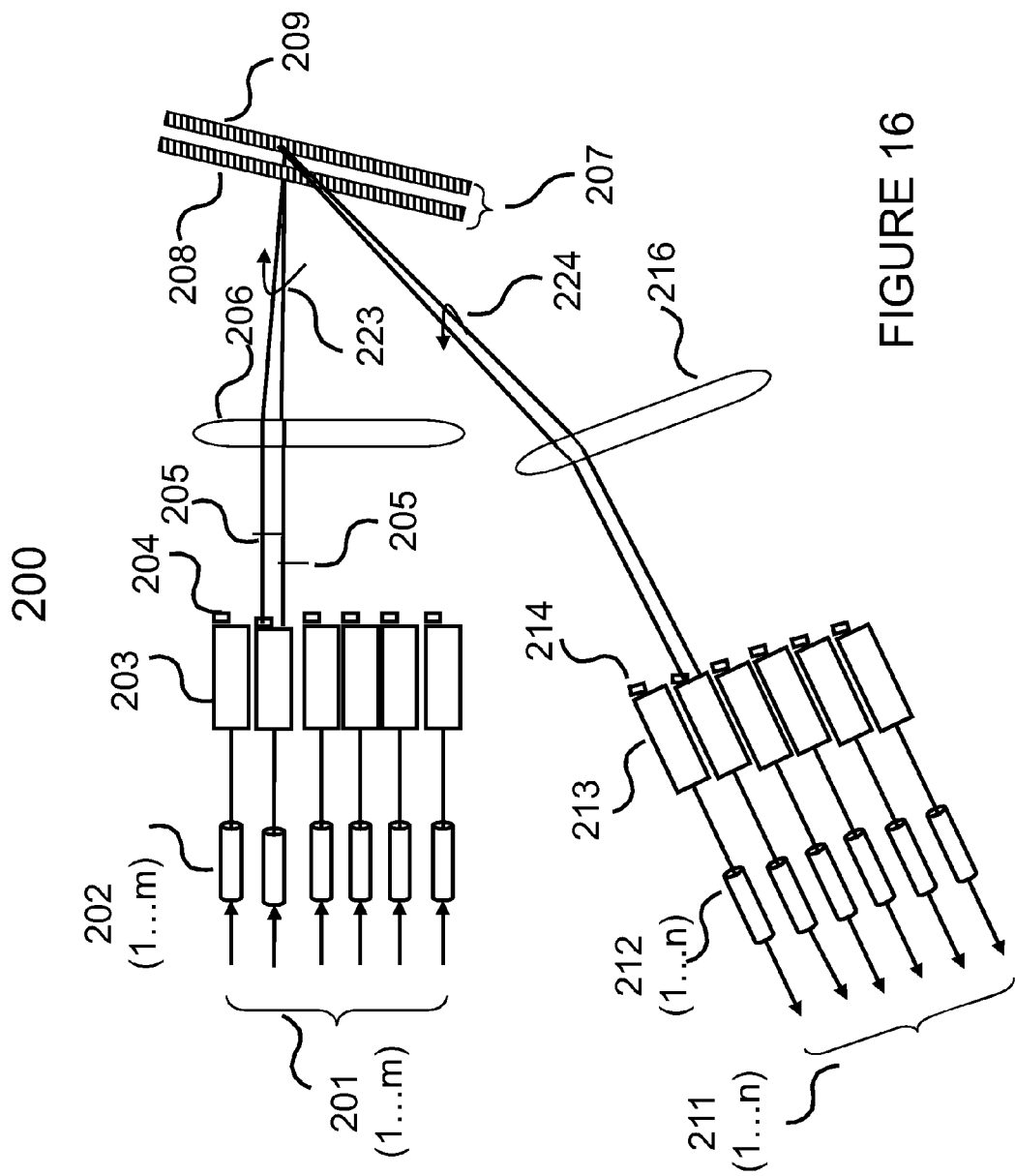
FIG. 16 is a schematic isometric view of the multi-pole optical signal switch shown in FIG. 15.

Reference is now made to FIG. 16, where 200 is a schematic isometric view of an m×n switch including a complete array of input and output ports 202 (1 ... m) and 212 (1 ... n), respectively. In this implementation, any number of input signals, each received at a different input port, may be directed towards any of the output ports. In the following description, each element shown in FIG. 16 is labeled and described only once for clarity. However, following description is pertinent to each of the multiplicity of identical elements and functions substantially in the same manner as their similar counterparts described in reference with FIG. 15.

Each input signal 201 is coupled via a fiber interface 202 of the array of input fiber interfaces 202 (1 ... m). The fiber interface 202 collimates the input signal and converts said input signal to a free space optical beam. Each input signal converted into a free space beam, passes through a polarization selection module 203 with a half wave plate 204 covering a portion of it, and generates a pair of beams 223 (hereinafter input beam pair) having a predetermined polarization state irrespective of the polarization state of the input free space beam. The direction of polarization is indicated by vertical lines 205. Each input beam pair is focused by a focusing element 206, on to a pixilated beam steering module 207 placed at the focal plane of the focusing element.

The pixilated beam steering module 207 comprises a pixilated beam steering array 209 and a corresponding pixilated, polarization control array 208. In the exemplary configuration shown in FIG. 16, the beam steering array 209 and the polarization control array 208, respectively, are disposed in two different optical paths. However, it is not necessary to be so in other configurations that will be apparent to those skilled in the art. Each beam steering array comprises a plurality of pixels (hereinafter beam steering pixel) that are independently tiltable in accordance with a control signal. Each beam steering pixel therefore deflects the incident input beam pair preferably in a plane perpendicular to the plane of the drawing, and towards a specific output port 212 of the plurality of output ports (212 (1 ... n)), selected in accordance with the tilt applied to the beam steering pixel.

The pixels of the polarization control array 208 (hereinafter polarization control pixel) selectively applies a controlled polarization rotation to each deflected beam pair 224. Each polarization control pixel in response to a respective control voltage, applies a predetermined amount of polarization to each of the deflected beam pairs impinging thereupon, such that the deflected beam pairs arrive at respective output ports they are destined for in the same predetermined polarization state as the input beam pair (total rotation 0°). Alternatively, the polarization control pixel applies a polarization rotation by a finite angle (e.g., 90°) for the deflected beam pairs that are targeted for attenuation so that they do not arrive at output ports they are not supposed to reach.

The deflected beam pair 224 is collimated by a second focusing element 216. The second focusing element directs the deflected beam pair back through a polarization conversion module 213 which is similar to the polarization selection module in reverse, including a half-wave plate 214 covering a part of the polarization conversion module on the side where the deflected beam pair is incident on the module. The polarization conversion module combines the deflected beam pair arriving with the same predetermined polarization state as the input beam pair, into an output beam and directs the output beam to a selected output port via an output collimator 212. The selection of the output port is determined by the amount of deflection and the polarization rotation applied in the beam steering module.

It should be recognized that the deflected beam pairs that arrive at an output port with a polarization rotation are not combined into an output beam and are thereby attenuated by an amount proportional to the applied polarization rotation. In this manner, an output beam that is not destined to reach any particular output port is blocked partially or completely, without interfering with the other output signals reaching that particular output port in a 'hitless' operation.

In the exemplary embodiments shown in FIGS. 15 and 16, the polarization selection module may be a birefringent walk-off crystal such as, Yittrium Ortho Vanadate crystal ($YVO_4$). However, other polarization components and methods well known in the art for introducing polarization diversity may be used without deviating from the basic principles of the current invention.

In FIG. 15, the first and second focusing elements are shown as lenses 156 and 166 only for illustrative purposes and are not limited only to lenses. Any focusing element capable of spatially separating different input beam pairs and subsequently focusing each one of the input beam pairs onto separate single pixel of the beam steering module may work equally well. Other focusing elements known in the art for example, a reflective component may equally be effective for this purpose. Accordingly, the beam steering module may be placed differently in the arrangement of the optical switch.

In another embodiment, the focusing elements 206 and 216 shown in FIG. 16 may be a single lens covering all the internal optical paths within the optical switch or a lens array, or a combination thereof. In embodiments where a lens array is used, individual lenses of the lens array may be disposed in each individual input and output optical signal paths. Such a configuration will be described later in reference with FIGS. 17A and 17B.

The beam steering module shown in FIGS. 15 and 16 may be implemented by a one-dimensional array of micro-electromechanical system (MEMS) mirrors where individual MEMS mirrors have a single rotation axis, and the polarization control array may comprise a liquid crystal (LC) array. Each pixel of the MEMS mirror array is controlled independently to apply a desired deflection and each pixel of the LC array is independently controlled to apply a desired polarization rotation to the beam pair passing therethrough. Each polarization combiner at the respective output ports either allows or blocks the deflected beam pair from reaching the output ports in a 'hitless' operation depending upon the polarization state of the deflected beam pair.

For the purpose of discussion, a 'hitless' operation is defined as a switching operation where the input beam to be switched to a selected output port is scanned by a corresponding MEMS mirror but do generate spurious output signals at any of the non-selected output ports. The beam steering module constructed according to the principles of the current invention achieves a 'hitless' operation by applying in a corresponding polarization control pixel, a predetermined polarization rotation to the beam pair while the beam pair is scanned by the corresponding MEMS mirror. After the beam pair has been scanned such that it has been switched to the selected output port, the predetermined polarization rotation by the corresponding polarization control pixel is no longer applied.

Figure 17A:
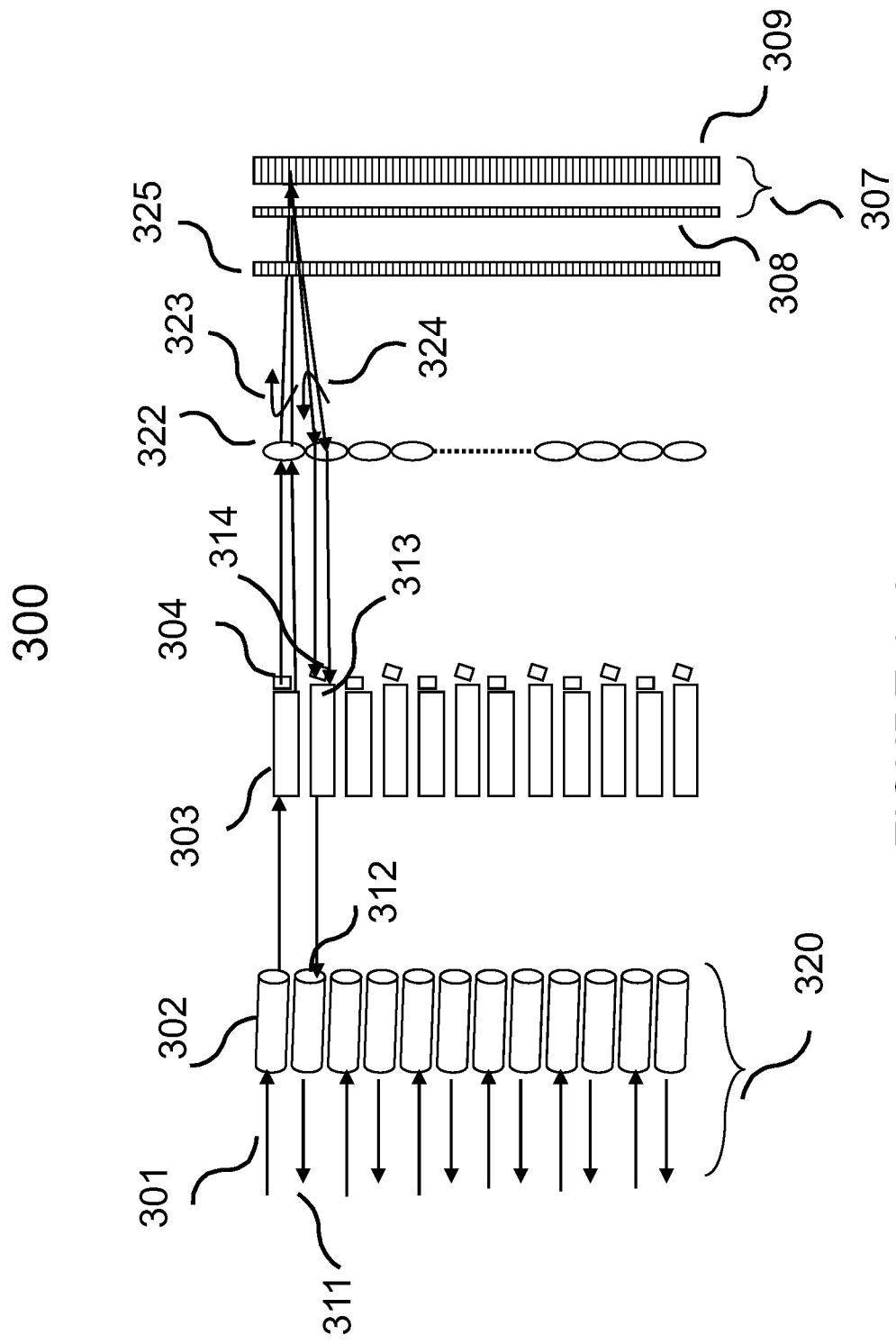
FIGS. 17A and 17B schematically illustrate different implementations of the multi-pole optical signal switch of FIGS. 15 and 16, in which the input and output fiber ports are aligned in one contiguous array.
Figure 17B:
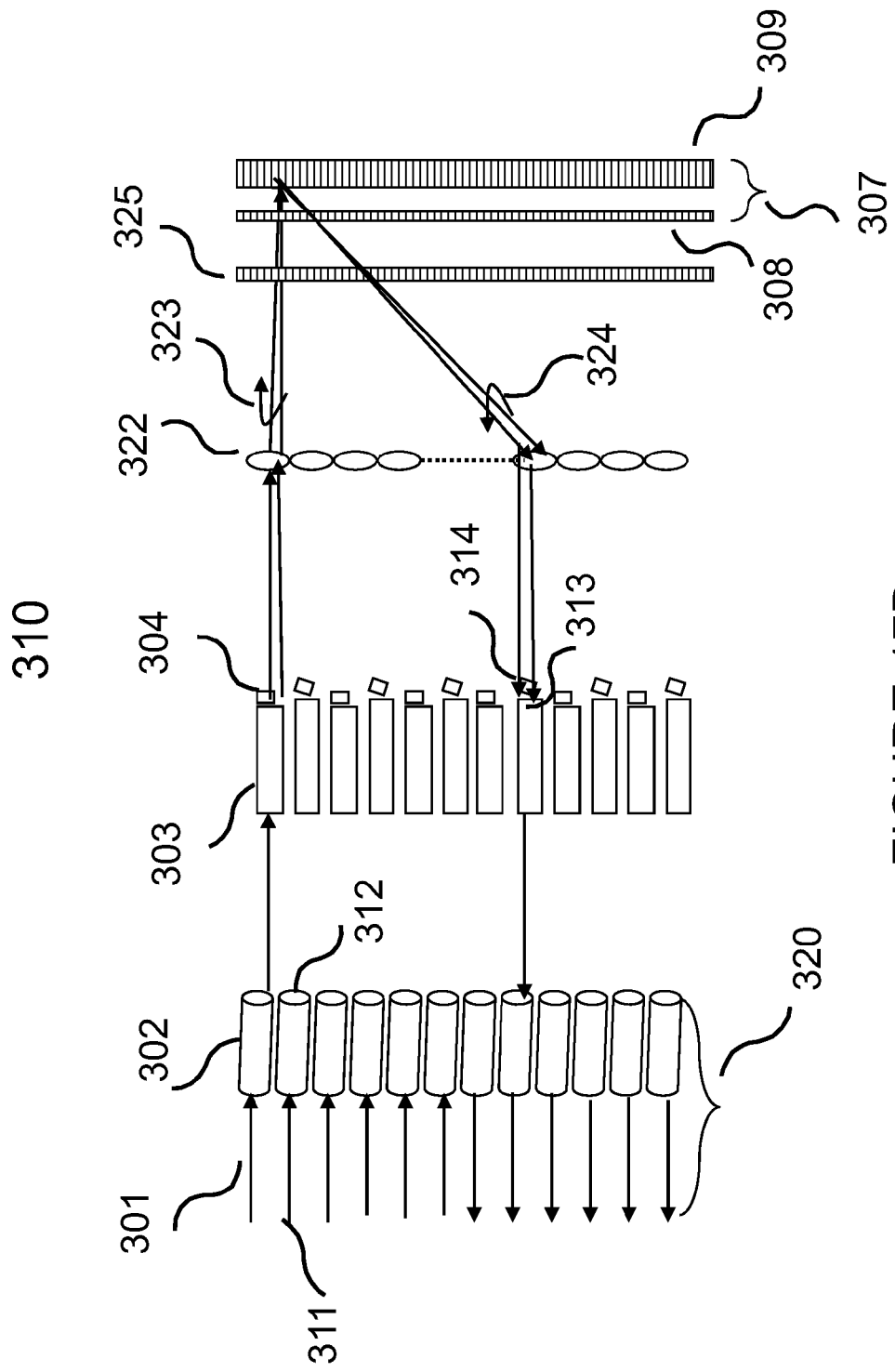

FIGS. 17A and 17B schematically illustrate different implementations of the multi-pole optical signal switch of FIGS. 15 and 16, in which the input and output fiber ports are aligned in one contiguous array. The two devices 300 and 310 shown in FIGS. 17A and 17B, respectively, differ from the devices shown in FIGS. 15 and 16 in the arrangement of input and output ports. As shown in FIGS. 17A and 17B, 'm' input and 'n' output fiber ports are aligned in one contiguous array 320. More specifically, the input and output ports may be arranged alternately, or with all the input ports at one end and all the output ports at the other end of the array as shown in FIGS. 17A and 17B. Advantageously, construction of the device in this implementation is very simple. All of the optical switching operations take place in a single plane, namely the plane connecting the input fiber array 320 with the one-dimensional pixilated beam steering array 309. In the exemplary embodiments schematically shown in FIGS. 17A and 17B, the focusing element is a lens array 322. In this implementation, each pixel of the one-dimensional beam steering array has a larger angular deflection than the embodiment shown in FIG. 16. An optional linear polarizing element 325 may be disposed for example before the beam steering module as shown in FIGS. 17A and 17B.

Figure 18A:
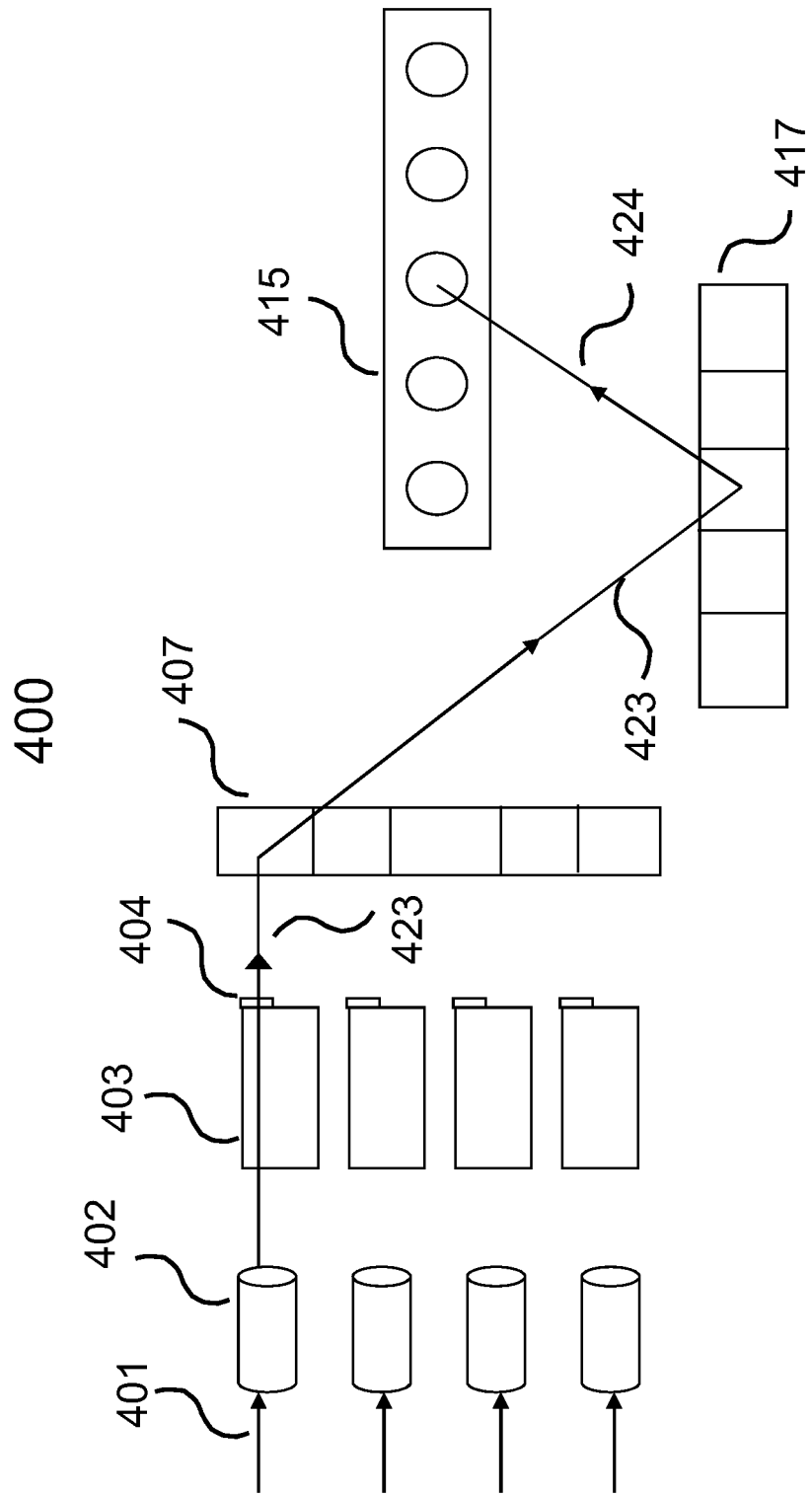
FIG. 18A schematically illustrates another implementation of the multi-pole optical signal switches using two one-dimensional MEMS mirror arrays where output ports are arranged in a one-dimensional array.
Figure 18B:
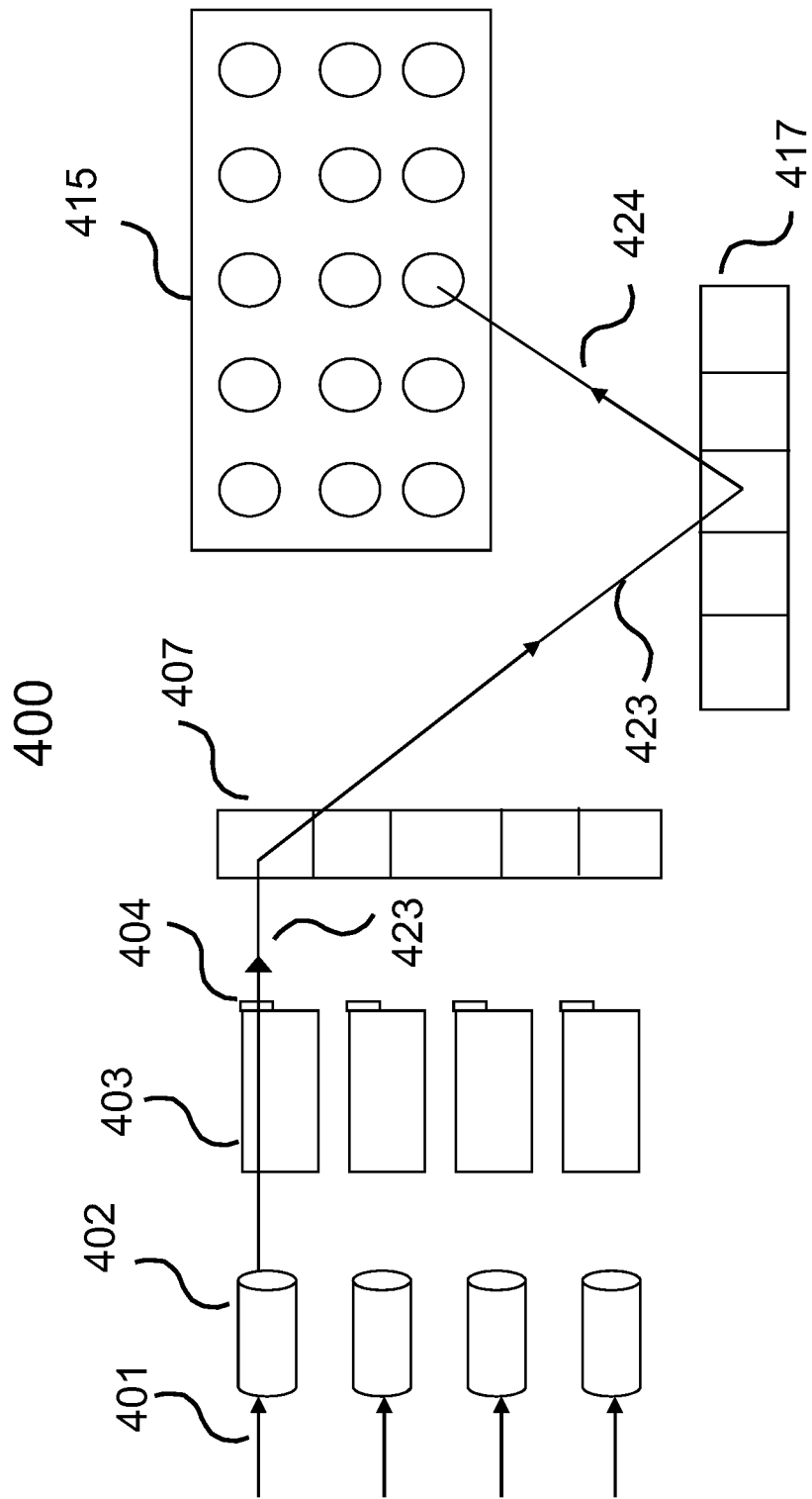
FIG. 18B schematically illustrates another implementation of the multi-pole optical signal switches using two one-dimensional MEMS mirror arrays where output ports are arranged in a two-dimensional array.

Additional embodiments of the present invention are shown schematically in FIGS. 18A and 18B. In these embodiments of optical switch 400, an input array of fibers 401 and an array of output fibers collectively referred as 415, are aligned essentially perpendicular to each other. In the illustrative examples shown in FIGS. 18A and 18B, focusing elements are not shown for clarity. The output ports shown in FIG. 18A are arranged in a one-dimensional array. In an alternative embodiment, shown in FIG. 18B, the output ports are arranged in a two-dimensional array. As shown in FIGS. 18A and 18B, two one-dimensional beam steering modules 407 and 417 are arranged perpendicular to each other in two different planes. In particular, the beam steering module 407 steers the input beam pair to the plane of the second beam steering module 417 which, in turn steers the deflected beam pair in a plane perpendicular to that of the incident beams and to a desired output port in accordance with the control signals applied to individual pixels of the beam steering arrays 407 and 417. In an exemplary implementation, the beam steering modules include a one-dimensional MEMS mirror arrays with single axis of rotation, for beam steering, in combination with a one-dimensional LC arrays for polarization control of the individual output beams. One advantage of this particular arrangement is that the angular range required of each pixel of the beam steering array is reduced as compared to the arrangements shown in FIGS. 15-17. While the arrangement shown in FIGS. 18A and 18B requires two one-dimensional beam steering modules, it may still be cost-effective relative to the arrangements shown in FIGS. 15-17 because the control system required for two one-dimensional beam steering array may be less than the cost of implementing a more complex control system for a two-dimensional MEMS array.

In all of the embodiments described above, the image attenuation is performed by rotating the polarization of the beams using a pixilated LC array. It is also possible to generate beam attenuation by means of the phase control of the beam, in which case there is no need for polarization diversity and its related components. In addition, it is possible to use a rotator together with a polarizer in order to convert the input beams to circular polarization. This will entail a 3 dB power loss in passage through the device, but will eliminate the effects of polarization dispersion loss in passage through the LC array pixel. These and other alternative implementations within the principles of current invention should be apparent to those skilled in the art.

FIG. 19 shows an end view 500 of a polarization selection module of FIGS. 15 and 16, with its half-wave plate covering one part of the output port. A similar device operated in reverse, may also be used as the polarization conversion module. The polarization selection module in this exemplary embodiment is a birefringent walk-off crystal with a half-wave plate 504 covering one part of the output port. Each free space input beam arranged in a vertical stack within the optical switch, traversing the polarization selection module, is split into two beams 523 and 533 that form an input beam pair having substantially similar well-defined polarization states irrespective of the initial polarization state of the input beam.

In a multi-port router, steering an input signal to a desired output port may require the requested signal to be steered across other output ports. More specifically, referring back to FIG. 17B, when an input signal 301(1) from an input port 302(1) is steered between two output ports, 312(1) and 312(3), the steered beam would momentarily cross the output port 312(2) placed in between. As a result, an undesirable spurious signal will momentarily appear at the output port 312(2). One important aspect of the present invention is to provide a 'hitless' beam steering. In a 'hitless' beam steering operation, the input beam would bypass the port 312(2) that is not a selected output port without any spurious signal appearing therethrough.

FIG. 20 illustrates schematically a hitless beam steering configuration according to one or more embodiments of the present invention. In an exemplary embodiment, the beam steering module may be implemented by a combination of a pixilated one-dimensional MEMS mirror array single axis steering and a pixilated LC array. In this configuration, a pixel of the MEMS mirror array primarily deflects the input beam incident thereupon, towards a desired output port, and a corresponding pixel of the LC array rotates the polarization of the input beam while the input beam is being deflected so that the input beam is attenuated when it crosses the other output ports. The combination of the LC array and the polarization conversion module functions as a switching shutter.

For example, in the configuration shown in the view 603, the optical switched beam 611 is steered directly to the destination port 621 and the path over the other output ports is blocked. The blocked path represented as 640, is achieved by applying an appropriate amount of control settings to the LC array pixel associated with the spatial channels over the output ports such that the transmission is blocked (in other words, beam 611 is completely attenuated) while the beam passes over the output ports other than 621. Once the optical switching process is completed, the transmission to the other output port may be unblocked and the optical switch can operate as programmed. Thus, the operation of the optical switch built according to the principles outlined above automatically prevents spurious signals to reach the ports other than the destination port.

One aspect of the beam steering module comprising the one-dimensional beam steering array in combination with the pixilated LC array lies in the attenuation control function of the LC array pixel. An advantage of this aspect is that the output beam 624 may be completely coupled to the destination port 621 and any degree of attenuation may be controllably achieved by applying a polarization rotation in the LC array so as to generate the output signal with an attenuation. Therefore, distortion to the pass band shape may be significantly reduced or eliminated completely.

It is appreciated by persons skilled in the art that the present invention is not limited by what has been particularly shown and described hereinabove. Rather the scope of the present invention includes both combinations and sub combinations of various features described hereinabove as well as variations and modifications thereto which would occur to a person of skill in the art upon reading the above description and which are not in the prior art.

I claim:

1. An optical device comprising:
   a) multiple input ports and multiple output ports for transmitting wavelength division multiplexing (WDM) signals therethrough;
   b) a polarization transformation element that converts the wavelength division multiplexing (WDM) signals into a pair of optical beams having substantially the same polarization;
   c) a beam expanding element that laterally expands the pair of optical beams in a predetermined plane;
   d) a first and second array of liquid crystal (LC) pixels, each of the first and second arrays of LC pixels being positioned to receive a WDM signal transmitted through one of the ports; and
   e) a first and second array of reflective elements, each reflective element in the first and second arrays of reflective elements being associated with one of the LC pixels in the first and second arrays of LC pixels, the first array of LC pixels being positioned adjacent to the first array of reflective elements and the second array of LC pixels being positioned adjacent to the second array of reflective elements such that a WDM signal passes through an LC pixel prior to and after being reflected by an associated reflective element, wherein the second array of LC pixels and the second array of reflective elements are perpendicular to the first array of LC pixels and to the first array of reflective elements, the first array of LC pixels and the first array of reflective elements steering the pair of optical beams to the second array of LC pixels and to the second array of reflective elements, and wherein the LC pixels are controlled to cause a WDM signal incident thereon to attain an attenuation state while an output of the WDM signal is being switched by an associated reflective element.

2. The device of claim 1, wherein the LC pixels are further controlled to cause the WDM signal incident thereon to attain a transmissive state after the output of the WDM signal has been switched by the associated reflective element.

3. The device of claim 1, wherein at least one of the first and second array of reflective elements comprises an array of independently controlled micro-electro-mechanical system mirrors.

4. The device of claim 1, wherein the reflective elements are rotatable about at least one axis.

5. The device of claim 4, wherein the reflective elements are rotatable about first and second mutually orthogonal axes.

6. The device of claim 1, wherein the polarization transformation element comprises a beam splitting and combining module provided for each of the ports, the module including a beam displacing crystal and a half-wave plate.

7. The device of claim 1, wherein the beam expanding element comprises a pair of anamorphic prisms.

8. The device of claim 1, wherein the multiple input ports and multiple output ports are arranged in perpendicular one-dimensional arrays.

9. The device of claim 1, wherein the multiple output ports are arranged in a two-dimensional array.

10. The device of claim 1, wherein the pair of optical beams are deflected in a plane that is perpendicular to a plane comprising the multiple input ports.

11. An optical device having multiple input ports and multiple output ports configured to switch an output of a wavelength division multiplexing (WDM) signal, the optical device comprising:
   a) a polarization transformation element that converts the wavelength division multiplexing (WDM) signals into a pair of optical beams having substantially the same polarization;
   b) a beam expanding element that laterally expands the pair of optical beams in a predetermined plane;
   c) a first and second array of liquid crystal (LC) pixels, each of the first and second arrays of LC pixels being positioned in an optical path of a WDM signal transmitted through one of the ports; and
   d) a first and second array of reflective elements, each reflective element being associated with one of the LC pixels and being movable to multiple positions to direct a WDM signal transmitted through the associated LC pixel to any one of the multiple output ports, the first array of LC pixels being positioned adjacent to the first array of reflective elements and the second array of LC pixels being positioned adjacent to the second array of reflective elements such that a WDM signal passes through an LC pixel prior to and after being reflected by an associated reflective element, the second array of LC pixels and the second array of reflective elements are perpendicular to the first array of LC pixels and to the first array of reflective elements, wherein the first array of LC pixels and the first array of reflective elements steer the pair of optical beams to the second array of LC pixels and to the second array of reflective elements, and wherein the LC pixels and the reflective elements are controlled to switch an output of a WDM signal from a first input port to a second output port while attenuating substantially all of the WDM signal as one of the reflective elements is being moved to switch the output of the WDM signal from the first port and the second port.

12. The device of claim 11, wherein at least one of the first and second arrays of reflective elements comprises an array of independently controlled micro-electro-mechanical system mirrors.

13. The device of claim 11, wherein one of the LC pixels and one of the reflective elements associated therewith are controlled such that: (i) a polarization state of a WDM signal incident on the LC pixel is changed from a first state to a second state, (ii) then the reflective element is moved from a first position, at which position the WDM signal is directed to the first port, to a second position, at which position the WDM signal is directed to the second port, and (iii) then the polarization state of the WDM signal incident on the LC pixel is changed from the second state to the first state.

14. The device of claim 11, wherein the array of reflective elements are positioned adjacent to the array of LC pixels such that a WDM signal passes through an LC pixel prior to and after being reflecting by an associated reflective element.

15. The device of claim 11, wherein the reflective elements are rotatable about first and second mutually orthogonal axes.

16. The device of claim 11, further comprising: a beam splitting and combining module provided for each of the ports, the module including a beam displacing crystal and a half-wave plate.

17. The device of claim 11, wherein the multiple input ports and multiple output ports are arranged in perpendicular one-dimensional arrays.

18. The device of claim 11, wherein the multiple output ports are arranged in a two-dimensional array.

19. The device of claim 11, wherein the pair of optical beams are deflected in a plane that is perpendicular to a plane comprising the multiple input ports.

20. In an optical device having multiple ports including input ports and first and second output ports, multiple liquid crystal (LC) pixels, and multiple reflective elements, a polarization transformation device, and a beam expansion device, a method of switching outputs of multi-pole optical beams, each of which is supplied through a different one of the input ports, the method comprising:
   a) transforming a polarization state of the multi-pole optical beams into two beams of substantially the same polarization;
   b) laterally expanding the multi-pole optical beams in a predetermined plane;
   c) steering the multi-pole optical beams off a first beam steering array comprising at least some of the multiple LC pixels and at least some of the multiple reflective elements;
   d) directing the multi-pole optical beams to a second beam steering array comprising at least some of the multiple LC pixels and at least some of the multiple reflective elements, the second beam steering array being disposed perpendicularly to the first beam steering array;
   e) controlling a first LC pixel to change a polarization state of a multi-pole optical beam incident thereon from a first state to a second state;
   f) after the polarization state of the multi-pole optical beam has been changed from the first state to the second state, moving a reflective element associated with the first LC pixel from a first position, at which position the multi-pole optical beam is directed to the first output port, to a second position, at which position the multi-pole optical beam is directed to the second output port; and
   g) after the reflective element associated with the first LC pixel has been moved from the first position to the second position, controlling the first LC pixel to change the polarization state of the multi-pole optical beam from the second state to the first state.

21. The method of claim 20, further comprising: controlling a second LC pixel on which a different multi-pole optical beam is incident to change a polarization state of the different multi-pole optical beam from the first state to the second state; after the polarization state of the different multi-pole optical beam has been changed from the first state to the second state, moving a reflective element associated with the second LC pixel from a first position, at which position the different multi-pole optical beam is directed to a third port, to a second position, at which position the different multi-pole optical beam is directed to fourth port; and after the reflective element associated with the second LC pixel has been moved from the first position to the second position, controlling the second LC pixel to change the polarization state of the different multi-pole optical beam from the second state to the first state.

22. The method of claim 21, wherein the reflective elements are moved by rotating the reflective element about first and second mutually orthogonal axes.

23. The method of claim 21, wherein the LC pixels and the reflective elements associated therewith are closely positioned relative to each other so that the multi-pole optical beam is directed through the first LC pixel twice and the different multi-pole optical beam is directed through the second LC pixel twice.

24. The method of claim 21, wherein the multi-pole optical beam supplied through one of the ports and incident on the second LC pixel has the same spectral composition as the multi-pole optical beam output through the fourth port.

25. The method of claim 20, wherein the multi-pole optical beam supplied through one of the ports and incident on the first LC pixel has the same spectral composition as the multi-pole optical beam output through the second port.

26. The method of claim 20, wherein, while moving the reflective element associated with the first LC pixel from the first position to the second position, the multi-pole optical beam having the second polarization state is scanned from the first port to the second port in accordance with a movement of the reflective element.

\* \* \* \* \*